United States Patent
Nakamoto et al.

(10) Patent No.: US 12,134,216 B2
(45) Date of Patent: Nov. 5, 2024

(54) METHOD FOR PRODUCING MOLDED BODY BY COMPRESSION-MOLDING

(71) Applicant: Teijin Limited, Osaka (JP)

(72) Inventors: Daishiro Nakamoto, Osaka (JP); Daisuke Noto, Osaka (JP); Yuhei Konagai, Osaka (JP); Ichiro Kitano, Osaka (JP)

(73) Assignee: Teijin Limited, Osaka (JP)

( * ) Notice: Subject to any disclaimer, the term of this patent is extended or adjusted under 35 U.S.C. 154(b) by 238 days.

(21) Appl. No.: 17/780,801

(22) PCT Filed: Oct. 13, 2021

(86) PCT No.: PCT/JP2021/037967
§ 371 (c)(1),
(2) Date: May 27, 2022

(87) PCT Pub. No.: WO2022/097438
PCT Pub. Date: May 12, 2022

(65) Prior Publication Data
US 2022/0410443 A1  Dec. 29, 2022

(30) Foreign Application Priority Data
Nov. 4, 2020 (JP) ................................ 2020-184217

(51) Int. Cl.
*B29C 43/14* (2006.01)
*B29C 43/00* (2006.01)
(Continued)

(52) U.S. Cl.
CPC .......... *B29C 43/146* (2013.01); *B29C 43/003* (2013.01); *B29C 43/203* (2013.01);
(Continued)

(58) Field of Classification Search
CPC .......................... B29C 43/146; B29C 43/003
(Continued)

(56) References Cited

U.S. PATENT DOCUMENTS

| | | | |
|---|---|---|---|
| 8,771,452 B2 | 7/2014 | Kitagawa | |
| 9,307,803 B1* | 4/2016 | Folgar | ..................... B29C 43/02 |
| 9,592,853 B2 | 3/2017 | Aitharaju et al. | |
| 9,650,003 B2 | 5/2017 | Owens et al. | |

(Continued)

FOREIGN PATENT DOCUMENTS

| | | |
|---|---|---|
| JP | 2001-260130 A | 9/2001 |
| JP | 2008-246981 A | 10/2008 |

(Continued)

OTHER PUBLICATIONS

Nov. 22, 2021—International Search Report—Intl App PCT/JP2021/037967.

*Primary Examiner* — S. Behrooz Ghorishi
*Assistant Examiner* — Gregory C. Grosso
(74) *Attorney, Agent, or Firm* — Banner & Witcoff, Ltd.

(57) ABSTRACT

Problems of high impact resistance and "warpage" of a molded body are solved by a method for producing a molded body, including: using a mold MA and a mold MB, which are a pair of male and female molds, to compression-mold a material A and a material B in contact with the mold MA and the mold MB, respectively, in which the material A contains a carbon fiber and a thermoplastic resin M1, and the material B contains a glass fiber and a thermoplastic resin M2, the molded body includes a pair of side walls and a connecting wall that is connected to the side walls, the molded body has a wave shape in cross section, and a relationship between a flatness Fa of the molded body and a height h of the side wall satisfies $0 \leq Fa/h < 1.3$.

19 Claims, 15 Drawing Sheets

(51) Int. Cl.
  *B29C 43/20* (2006.01)
  *B29C 43/36* (2006.01)
  *B29C 70/46* (2006.01)
  *B29K 307/04* (2006.01)
  *B29K 309/08* (2006.01)
  *B29L 9/00* (2006.01)

(52) U.S. Cl.
  CPC .............. *B29C 43/36* (2013.01); *B29C 70/46* (2013.01); *B29C 2043/147* (2013.01); *B29K 2307/04* (2013.01); *B29K 2309/08* (2013.01); *B29K 2995/0089* (2013.01); *B29L 2009/00* (2013.01)

(58) Field of Classification Search
  USPC ......................................................... 156/196
  See application file for complete search history.

(56) References Cited

U.S. PATENT DOCUMENTS

| | | |
|---|---|---|
| 2013/0153130 A1 | 6/2013 | Kitagawa |
| 2016/0001816 A1* | 1/2016 | Aitharaju ............... B62D 21/15 296/187.03 |
| 2017/0057208 A1* | 3/2017 | Oosawa .................. B32B 27/20 |
| 2018/0093430 A1 | 4/2018 | Nakamura et al. |
| 2019/0211164 A1 | 7/2019 | Sano et al. |
| 2021/0316479 A1* | 10/2021 | Ichino ..................... B29C 43/14 |

FOREIGN PATENT DOCUMENTS

| | | |
|---|---|---|
| JP | 2017-065181 A | 4/2017 |
| JP | 2018-043412 A | 3/2018 |
| WO | 2012-026031 A1 | 3/2012 |
| WO | 2017-056683 A1 | 4/2017 |
| WO | 2018-052080 A1 | 3/2018 |

* cited by examiner

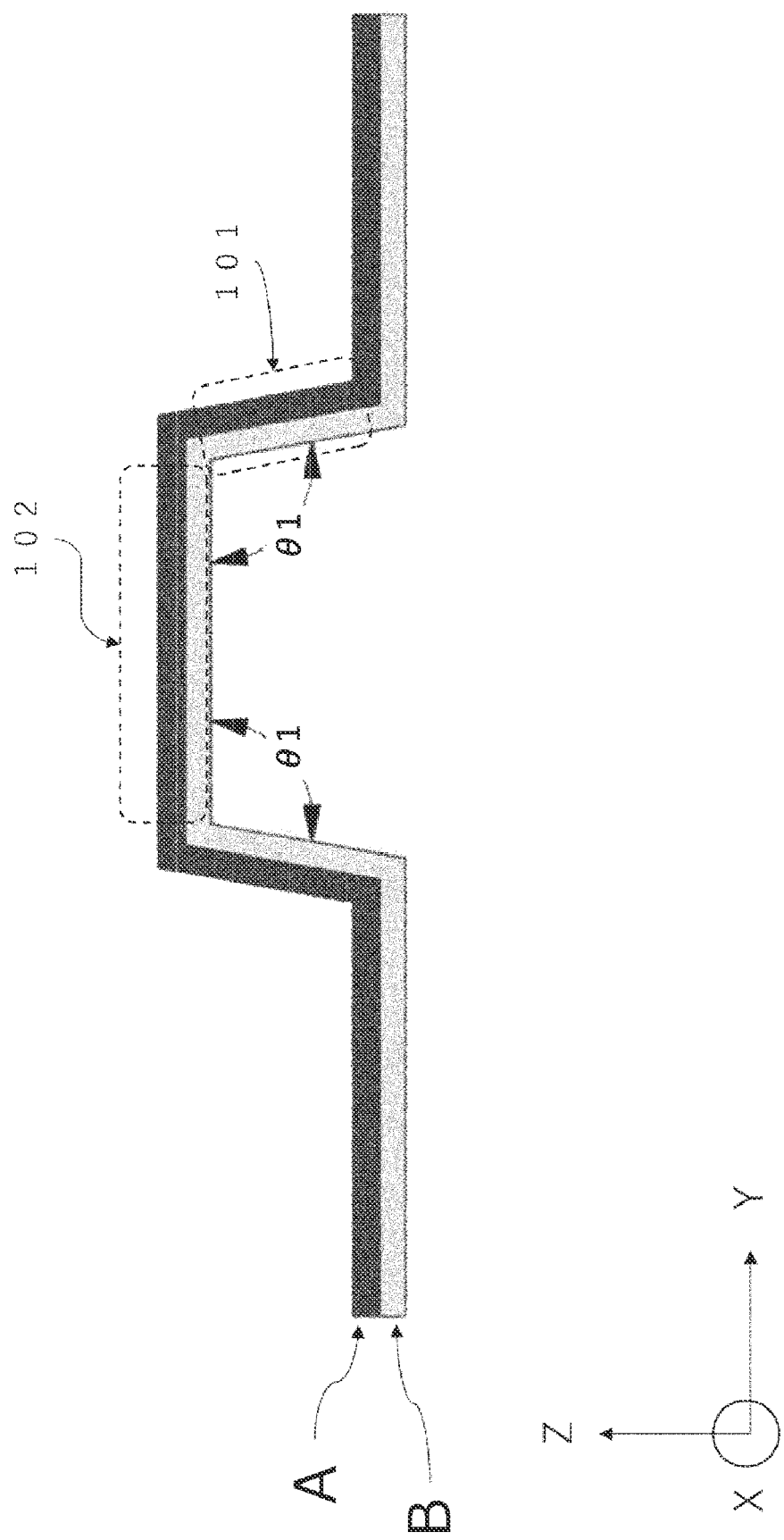

FIG.2A
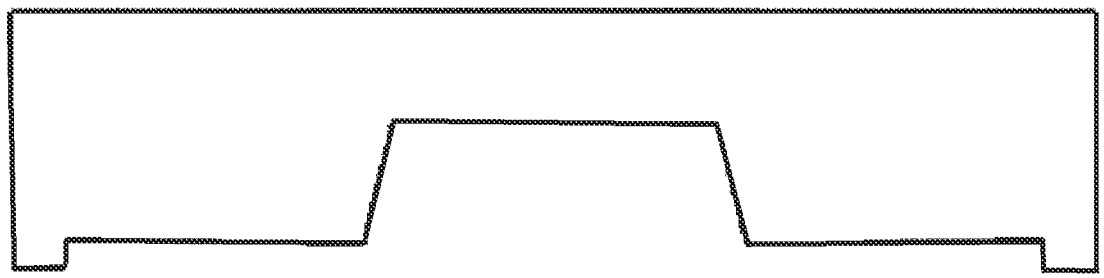
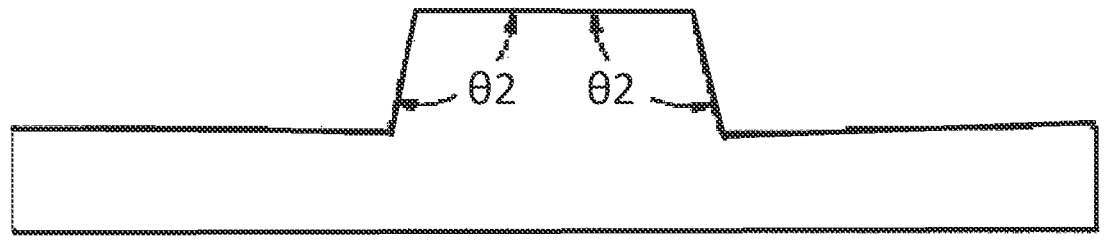
FIG.2B
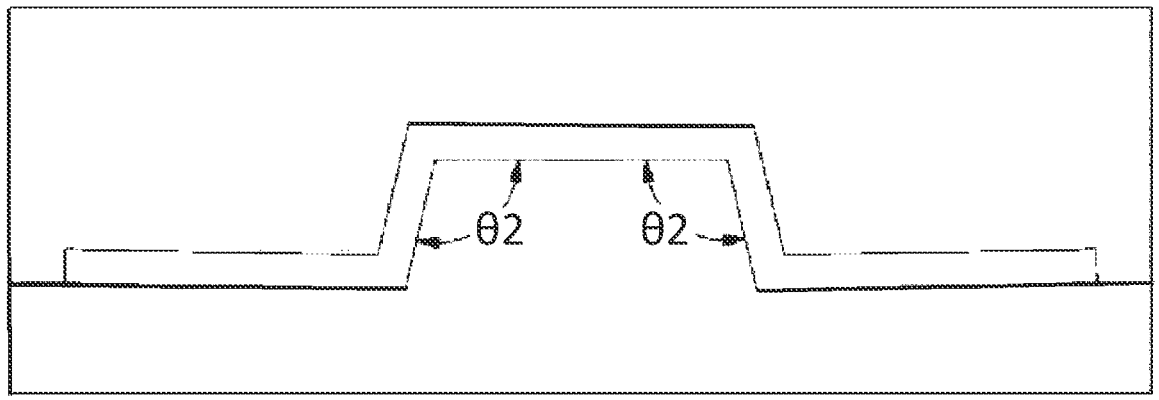

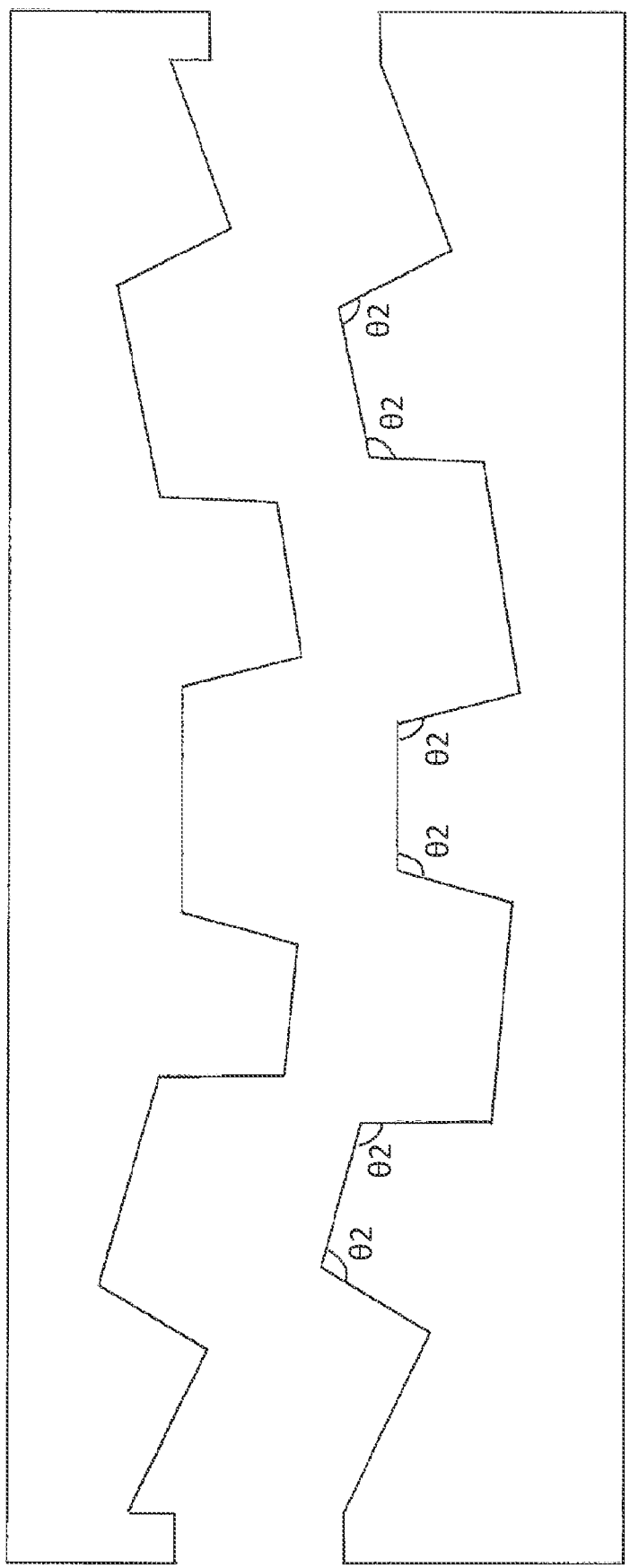

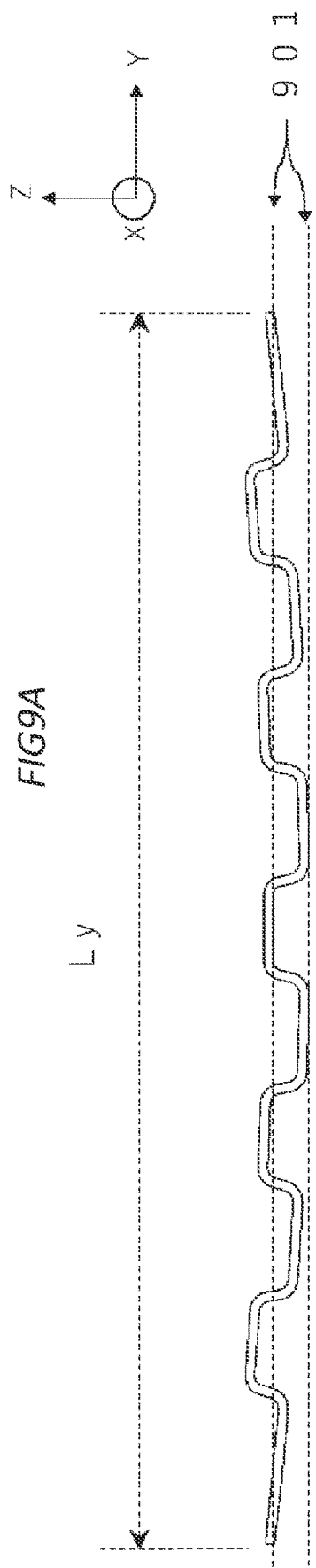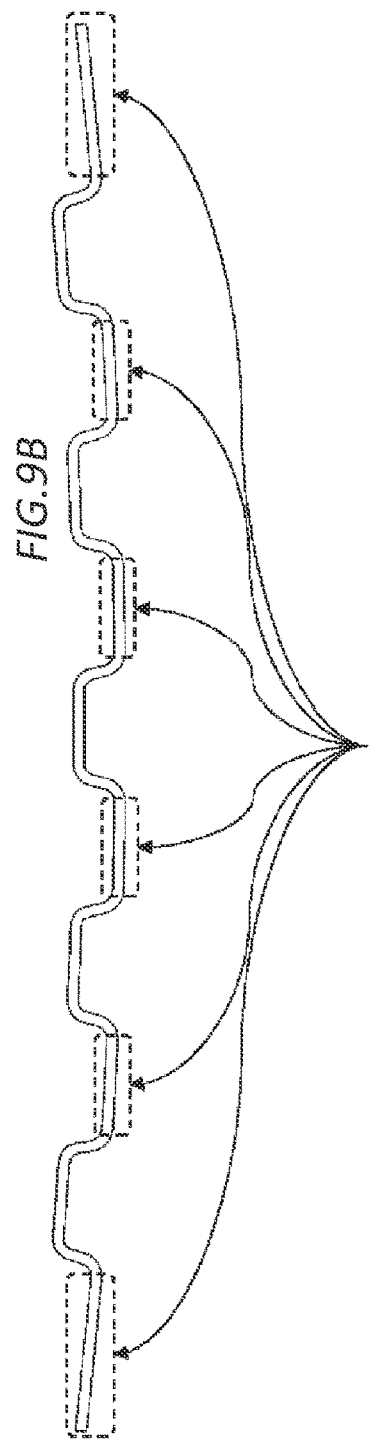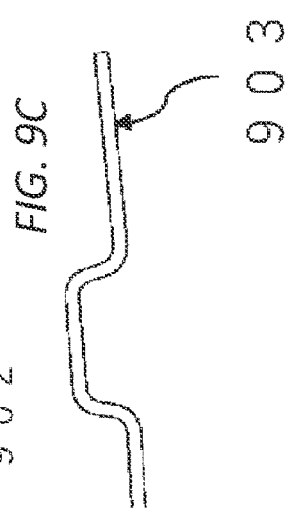

METHOD FOR PRODUCING MOLDED BODY BY COMPRESSION-MOLDING

CROSS REFERENCE TO RELATED APPLICATIONS

This application is a U.S. National Phase under 35 U.S.C. § 371 of International Application No. PCT/JP2021/037967, filed Oct. 13, 2021, which claims priority to Japanese Patent Application No. 2020-184217, filed Nov. 4, 2020, the entire contents of which is incorporated herein by reference.

TECHNICAL FIELD

The present invention relates to a method for producing a molded body by laminating and compression-molding: a material A containing a carbon fiber and a thermoplastic resin M1; and a material B containing a glass fiber and a thermoplastic resin M2.

BACKGROUND ART

In recent years, molded bodies are excellent in mechanical properties and are attracting attention as structural members of automobiles and the like.

Patent Literatures 1 and 2 describe a molded body formed by laminating and molding a thermoplastic resin layer reinforced by glass fibers and a thermoplastic resin reinforced with carbon fibers. Patent Literatures 3 and 4 describe a wave impact absorbing member using a thermoplastic resin reinforced with carbon fibers.

CITATION LIST

Patent Literature

Patent Literature 1: JP-A-2018-43412
Patent Literature 2: WO2018/052080, pamphlet
Patent Literature 3: U.S. Pat. No. 9,650,003
Patent Literature 4: U.S. Pat. No. 9,592,853

SUMMARY OF INVENTION

Technical Problem

However, since the material described in Patent Literature 1 has a laminated structure in which a glass fiber composite material is sandwiched between carbon fiber composite materials, the carbon fiber composite materials are disposed on both surface layers. In this case, since an elongation at break of the carbon fiber composite materials on both surface layers is small, the rigidity, which is a main required performance of, for example, an automobile, is not satisfied, and a layer on an opposite side to a side receiving an impact is easily broken when the impact is received. Although the glass fiber composite material present in a central layer has a large elongation at break, the glass fiber composite material present in the inside of the molded body does not contribute to prevention of cracks of the molded body subjected to an impact.

In the molded body described in Patent Literature 2, although the glass fiber composite material and the carbon fiber composite material are laminated in two layers, a problem of warpage occurs due to a difference between linear expansion coefficients of the glass fiber composite material and the carbon fiber composite material. When the warpage occurs, it is difficult to assemble, for example, an automobile in combination with other components.

In the inventions described in Patent Literatures 3 and 4, the molded body is formed of only the carbon fiber composite material, so that the problem of warpage is not recognized.

Accordingly, an object of the present invention is to provide a method for producing a molded body by which high impact resistance of the molded body is satisfied and the problem of "warpage" of the molded body is solved.

Solution to Problem

In order to solve the above problems, the present invention provides the following solutions.

1. A method for producing a molded body, including:
    bringing a material A into contact with a mold MA; bringing a material B into contact with a mold MB; and compression-molding using the mold MA and the mold MB which are a pair of male and female molds, in which
    the material A contains a carbon fiber and a thermoplastic resin M1,
    the material B contains a glass fiber and a thermoplastic resin M2,
    the molded body includes a pair of side walls and a connecting wall that is connected to the side walls,
    cross section of the molded body has a wave shape, and
    a relationship between a flatness Fa of the molded body and a height h of the side wall satisfies $0 \leq Fa/h < 1.3$.

2. The method for producing a molded body according to 1, in which the cross section of the molded body has a plurality of wave shapes, and a length in a wave direction is 1 m or more.

3. The method for producing a molded body according to any one of 1 and 2, in which the molded body includes the pair of side walls and the connecting wall that is connected to the side walls, and an angle $\theta 1$ between the side wall and the connecting wall on a side where the material B is present in a surface layer satisfies $90° \leq \theta 1 < 160°$.

4. The method for producing a molded body according to 3, in which the mold MB has a mold surface S1 for forming the connecting wall and a mold surface S2 for forming the side wall, and an angle $\theta 2$ between S1 and S2 satisfies $\theta 1 < \theta 2$.

5. The method for producing a molded body according to 4, in which
    Xa, Xb, $\theta 1$, and $\theta 2$ satisfy the following formulae (1) and (2), where Xa is a linear expansion coefficient of the material A, and Xb is a linear expansion coefficient of the material B, $$0.01 \leq Xa/Xb < 1 \quad \text{Formula (1)}$$

$$0 \leq (\theta 2 - \theta 1) \div (Xa/Xb) < 1.0 \times 10^3 \quad \text{Formula (2)}$$

in which the linear expansion coefficient Xa of the material A is a linear expansion coefficient of the material in a direction that becomes a wave direction when the molded body is formed, and
    the linear expansion coefficient Xb of the material B is a linear expansion coefficient of the material in the direction that becomes the wave direction when the molded body is formed.

6. The method for producing a molded body according to any one of 1 to 5, in which a flatness Fc of a mold cavity used for compression-molding satisfies $Fa \leq Fc$.

7. The method for producing a molded body according to 6, in which
the following formulae (1) and (3) are satisfied, where Xa is a linear expansion coefficient of the material A, and Xb is a linear expansion coefficient of the material B, $$0.01 \leq Xa/Xb < 1 \quad \text{Formula (1)}$$

$$0 \leq (Fc-Fa)/h \div (Xa/Xb) < 1.0 \times 10^3 \quad \text{Formula (3)}$$

in which the linear expansion coefficient Xa of the material A is a linear expansion coefficient of the material in a direction that becomes the wave direction when the molded body is formed, and
the linear expansion coefficient Xb of the material B is a linear expansion coefficient of the material in the direction that becomes the wave direction when the molded body is formed.

8. The method for producing a molded body according to any one of 1 to 7, in which
the following formulae (1) and (4) are satisfied, where Xa is a linear expansion coefficient of the material A, and Xb is a linear expansion coefficient of the material B, $$0.01 \leq Xa/Xb < 1 \quad \text{Formula (1)}$$

$$0 < |ta-tb| \div (Xa/Xb) < 5000 \quad \text{Formula (4)}$$

Xa: linear expansion coefficient of material A
Xb: linear expansion coefficient of material B
ta: temperature of mold MA
tb: temperature of mold MB
in which the linear expansion coefficient Xa of the material A is a linear expansion coefficient of the material in a direction that becomes the wave direction when the molded body is formed, and
the linear expansion coefficient Xb of the material B is a linear expansion coefficient of the material in the direction that becomes the wave direction when the molded body is formed.

9. The method for producing a molded body according to any one of 1 to 8, in which the mold MA is an upper mold, and the mold MB is a lower mold.

10. The method for producing a molded body according to any one of 1 to 9, in which the molded body is an impact resistant absorber, and the material A is on a side to which an impact is applied.

11. The method for producing a molded body according to any one of 1 to 10, in which a thickness 1a of the material A is 0.5 mm or more and less than 5.0 mm, and a thickness 1b of the material B is 0.5 mm or more and 3.0 mm or less, and $1 < 1a/1b < 0.6$ or $0.1 < 1b/1a < 0.6$ is satisfied.

12. The method for producing a molded body according to any one of 1 to 11, in which
a relationship between a volume fraction of fibers VfA of the material A and a volume fraction of fibers VfB of the material B satisfies the following formulae (1) and (5), where Xa is the linear expansion coefficient of the material A, and Xb is the linear expansion coefficient of the material B, $$0.01 \leq Xa/Xb < 1 \quad \text{Formula (1)}$$

$$0.3 < VfA/VfB \leq 3.0 \quad \text{Formula (5)}$$

the linear expansion coefficient Xa of the material A is a linear expansion coefficient of the material in a direction that becomes the wave direction when the molded body is formed, and
the linear expansion coefficient Xh of the material B is a linear expansion coefficient of the material in the direction that becomes the wave direction when the molded body is formed.

13. The method for producing a molded body according to any one of 1 to 12, in which a rib is provided between the connecting wall and the side wall.

14. The method for producing a molded body according to any one of 1 to 13, in which the molded body further comprises
a material C between the material A and the material B,
in which a relationship among the linear expansion coefficient Xa of the material A, the linear expansion coefficient Xb of the material B, and a linear expansion coefficient Xc of the material C satisfies Xa<Xc<Xb, in which
the linear expansion coefficient Xa of the material A is a linear expansion coefficient of the material in a direction that becomes the wave direction when the molded body is formed,
the linear expansion coefficient Xh of the material B is a linear expansion coefficient of the material in the direction that becomes the wave direction when the molded body is formed, and
the linear expansion coefficient Xc of the material C is a linear expansion coefficient of the material in a direction that becomes the wave direction when the molded body is formed.

15. The method for producing a molded body according to any one of 1 to 14, in which
a linear expansion relaxation agent is mixed such that $0.8 \leq Xa/Xb \leq 1$ is satisfied, where Xa is the linear expansion coefficient of the material A, and Xb is the linear expansion coefficient of the material B, in which
the linear expansion coefficient Xa of the material A is a linear expansion coefficient of the material in a direction that becomes the wave direction when the molded body is formed, and
the linear expansion coefficient Xb of the material B is a linear expansion coefficient of the material in the direction that becomes the wave direction when the molded body is formed.

16. The method for producing a molded body according to any one of 1 to 15, in which
the thermoplastic resin M2 having a smaller linear expansion coefficient than that of the thermoplastic resin M1 is used to adjust to $0.8 \leq Xa/Xb \leq 1$, where Xa is the linear expansion coefficient of the material A, and Xb is the linear expansion coefficient of the material B,
the linear expansion coefficient Xa of the material A is a linear expansion coefficient of the material in a direction that becomes the wave direction when the molded body is formed, and
the linear expansion coefficient Xb of the material B is a linear expansion coefficient of the material in the direction that becomes the wave direction when the molded body is formed.

17. The method for producing a molded body according to any one of 1 to 16, in which a temperature to of the mold MA and a temperature tb of the mold MB are equal to or lower than room temperature +10° C.

18. A method for producing a joined body, the method comprising: joining a molded body produced by the producing method according to any one of 1 to 17, in which the molded body includes a pair of side walls and a connecting wall that is connected to the side walls, an angle θ1 between the side wall and the connecting wall on a side where the material B is present in a surface layer satisfies 90°≤θ1<160°, by reducing the angle θ1 of the molded body by stress deformation to satisfy a relationship 0≤Fa'/h<0.1 between a flatness Fa' of the molded body after the stress deformation and a height h of the side wall.

19. The method for producing a molded body according to any one of 1 to 17, in which the material A and the material B are laminated and then subjected to compression-molding.

20. The method for producing a molded body according to 19, in which the material A and the material B have a flat plate shape.

21. The method for producing a molded body according to any one of 19 and 20, in which when the material A and the material B are formed into the molded body, the material A forms a material layer A and the material B forms a material layer B.

Advantageous Effects of Invention

In the molded body produced by the producing method of the present invention, the material A containing rigid carbon fibers is provided as a surface layer (preferably a design surface) with rigidity, and the opposite surface layer is formed of the material B containing glass fibers. Therefore, when a material A side of the molded body is impacted, the material B present in the opposite side has a large elongation at break, so that the material B is less likely to crack. In addition, the molded body produced by the producing method of the present invention can solve the problem of warpage in addition to impact resistance.

BRIEF DESCRIPTION OF DRAWINGS

FIG. 1 is a schematic view showing an example of a molded body produced by a producing method of the present invention.

FIG. 2A is a schematic view showing an open state of a pair of male and female molds.

FIG. 2B is a schematic view showing a closed state of the pair of female and male molds.

FIG. 5A is a schematic view showing an open state of a pair of male and female molds.

FIG. 9A is a schematic view in which an observation range of a molded body is cut out such that a length Ly in a wave direction becomes 40 cm, and a cross section of a wave shape is observed, and shows a method of measuring a flatness.

FIG. 9B is a schematic view showing a lower wall.

FIG. 9C is a schematic view showing a lower surface of the lower wall.

DESCRIPTION OF EMBODIMENTS

[Material]

Figure 3A:
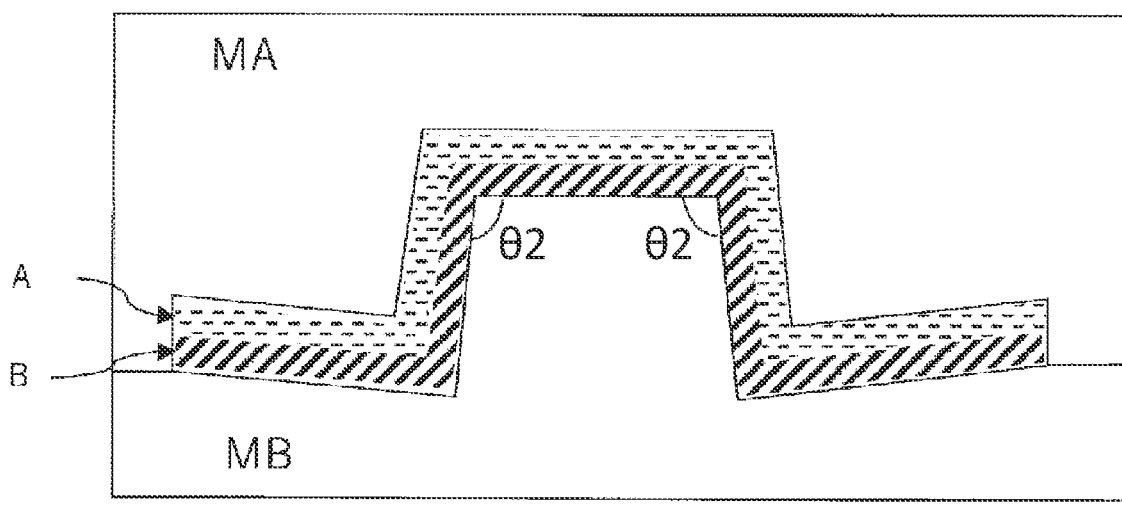
FIG. 3A is a schematic view showing a state in which a material (A) and a material (B) are laminated and compression-molded by a mold.
Figure 3B:
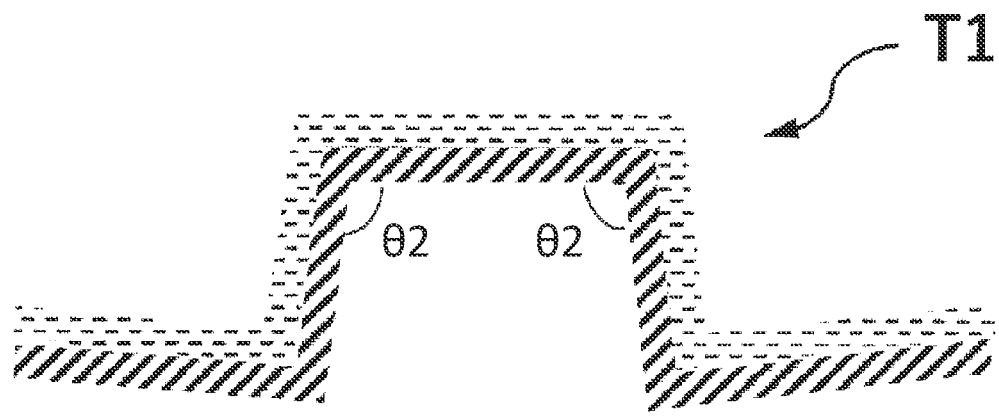
FIG. 3B is a schematic view showing a molded body taken out from the mold.

In the present specification, a material A, a material B, or a material C may be simply referred to as a "material" in general. The "material" is a concept including the material A, the material B, or the material C, or a laminate of a plurality of materials such as material A/material B.

It is preferable that and the material B have a flat plate shape, and it is preferable that the material A and the material B form a material layer A and a material layer B respectively when the material A and the material B having a flat plate shape are laminated and compression-molded to form a molded body. The flat plate shaped material forms a single layer when formed into a molded body.

[Material A and Material B]

The material A contains carbon fibers and a thermoplastic resin M1, and the material B contains glass fibers and a thermoplastic resin M2.

In the production of the molded body in the present invention, the material A is brought into contact with a mold MA, the material B is brought into contact with a mold MB, and the materials A and B are compression-molded using the mold MA and the mold MB which are a pair of male and female molds. In other words, one surface of the produced molded body is the material A, and a surface on the opposite side is the material B. A laminated structure of the materials is not particularly limited, and may be A/B, may be a four-layer configuration of A/B/A/B, or may be a six-layer configuration of A/B/A/B/A/B. Here, the simple description of "A" and "B" means each layer.

Since one surface of the molded body is the material A, and the surface on the opposite side is the material B, the material B in the surface layer on the opposite side has a large elongation at break particularly when an impact is applied to the surface of the material A, and thus it is preferable in that cracks are less likely to occur in the material B. It is noted that since the rigidity of the molded body is insufficient when only the material B is used, it is necessary to dispose the material A containing carbon fibers on one surface layer. In other words, the molded body produced by the producing method of the present invention is preferably a molded body which is an impact resistant absorber in which the material A is served as a surface which receives impact. The molded body is preferably used for automobile components that are required to have both rigidity and impact resistance.

On the other hand, for example, in the case of line-symmetric layer configurations such as a configuration of A/B/A in which a material B containing glass fibers is sandwiched by materials A each containing carbon fibers as described in JP-A-2018-43412, or a configuration of B/A/B, warpage of the molded body is easily prevented since a difference in linear expansion coefficient is canceled, but there is the following problem.

In the case of A/B/A, cracks are likely to occur when an impact is applied because the surface layer on the side opposite to the side on which the impact is applied is a carbon fiber composite material. In the case of B/A/B, the molded body does not have sufficient rigidity because carbon fibers are not contained in the surface layer contributing to rigidity. When the material A is present in a central layer, the material A hardly contributes to ensuring the rigidity of the molded body.

[Thickness of Material A and Material B]

Thicknesses of the material A and the material B are not particularly limited, but a thickness 1a of the material A is preferably 0.5 mm or more and less than 5.0 mm, a thickness 1b of the material B is preferably 0.5 mm or more and 3.0 mm or less, and the thickness 1a and the thickness 1b preferably satisfy $0.1 < 1a/1b < 0.6$ or $0.1 < 1b/1a < 0.6$. More preferably the thickness 1a and the thickness 1b satisfy $0.1 < 1a/1b < 0.2$ or $0.1 < 1b/1a < 0.2$. Within this range, even when there is a difference in the linear expansion coefficient between the materials, the difference is less likely to appear as warpage.

An upper limit of the thickness 1a of the material A is more preferably 4.0 mm or less, and still more preferably 3.0 mm or less.

An upper limit of the thickness 1b of the material B is more preferably 2.0 mm or less, even more preferably 1.5 mm or less, and still more preferably 1.0 mm or less.

The thickness of the material of each layer may be uniform inside the molded body after compression-molding. In other words, the compression-molding of the present invention may be non-fluid molding, and the compression-molding may be performed by charging a material into a mold at a charge rate of 100% or more.

Charge rate (%)=100×(projected area (mm$^2$) of material $A$ and material $B$ after laminated)/(area (mm$^2$) of mold cavity)

When the material A and the material B have a flat plate shape, the projected area can be easily measured.

[Material C]

As a material for producing the molded body of the present invention, the material C may be contained between the material A and the material B. At this time, it is preferable that a relationship among a linear expansion coefficient Xa of the material A, a linear expansion coefficient Xb of the material B, and a linear expansion coefficient Xc of the material C satisfies Xa<Xc<Xb. Xa<Xb<Xc or Xc<Xa<Xb may be satisfied. A layer configuration at this time may be not only a three-layer configuration of A/C/B, but also a four-layer configuration of A/C/A/B, A/B/C/B, or the like, or a five-layer configuration of A/C/B/A/B, A/B/A/C/B, or the like. Here, the simple description of "A", "B", and "C" means each layer.

In the production of the molded body in the present invention, a mold MA and a mold MB, which are a pair of male and female molds, are used to bring the material A into contact with the mold MA and bring the material B into contact with the mold MB respectively, and the materials A and B are compression-molded. Therefore, even when the molded body contains the material C, one surface of the molded body is still the material A, and a surface on the opposite side is still the material B.

Needless to say, the molded body may contain a material D other than the material C.

[Carbon Fiber]

The material A contains a carbon fiber. As the carbon fiber, a polyacrylonitrile (PAN)-based carbon fiber, a petroleum and coal pitch-based carbon fiber, a rayon based carbon fiber, a cellulose-based carbon fiber, a lignin-based carbon fiber, a phenol-based carbon fiber, and the like are generally known, but any of these carbon fibers can be suitably used in the present invention. Among these, in the present invention, it is preferable to use a polyacrylonitrile (PAN)-based carbon fiber from the viewpoint of excellent tensile strength.

[Fiber Diameter of carbon Fiber]

A fiber diameter of a single yarn (in general, a single yarn may be referred to as a filament) of the carbon fiber used in the present invention may be appropriately determined depending on the type of the carbon fiber, and is not particularly limited. In general, an average fiber diameter is preferably in a range of 3 µm to 50 µm, more preferably in a range of 4 µm to 12 µm, and still more preferably in a range of 5 µm to 8 µm. When the carbon fiber is in a form of a fiber bundle, a diameter of the carbon fiber refers to a diameter of the carbon fiber (single yarn) constituting the fiber bundle instead of a diameter of the fiber bundle. The average fiber diameter of the carbon fibers can be measured, for example, by a method described in HIS R-7607: 2000.

[Glass Fiber]

The material B contains glass fibers. The type of the glass fiber is not particularly limited, and any of glass fibers formed of E glass, A glass, or C glass may be used, or a mixture thereof may be used. The glass fiber in the present invention is not particularly limited, but an average fiber diameter of the glass fibers is preferably 1 µm to 50 µm, and more preferably 5 µm to 20 µm.

[Sizing Agent]

The carbon fiber or glass fiber used in the present invention may have a sizing agent attached to the surface thereof. When a reinforcing fiber to which the sizing agent is attached is used, the type of the sizing agent can be appropriately selected according to the types of the reinforcing fiber and a matrix resin, and is not particularly limited.

[Weight Average Fiber Length]

The carbon fiber is preferably a discontinuous fiber, and a weight average fiber length thereof is preferably 1 mm or more and 100 mm or less. Similarly, the glass fiber is preferably a discontinuous fiber, and a weight average fiber length thereof is preferably 1 mm or more and 100 mm or less. In order to solve the problem of warpage, the fiber is preferably a continuous fiber, but the above range of the weight average fiber length is preferable from the viewpoint of improving formability.

Hereinafter, the glass fiber and/or the carbon fiber are collectively referred to as the "reinforcing fiber". In other words, the reinforcing fiber is at least one of a glass fiber and a carbon fiber.

The weight average fiber length of the reinforcing fibers is more preferably 5 mm or more and 100 mm or less, still more preferably 5 mm or more and 80 mm or less, and yet still more preferably 10 mm or more and 60 mm or less. When the weight average fiber length of the reinforcing fibers is 100 mm or less, the fluidity of the material A and/or the material B is improved, and a desired molded body shape is easily obtained at the time of compression-molding. On the other hand, when the weight average fiber length is 1 mm or more, the mechanical strength of the molded body is easily improved.

In the present invention, reinforcing fibers having different fiber lengths may be used in combination. In other words, the reinforcing fiber may have a single peak at the weight average fiber length, or may have a plurality of peaks.

An average fiber length of the reinforcing fibers can be determined, for example, by measuring the fiber lengths of 100 fibers randomly extracted from the molded body up to a unit of 1 mm using a caliper or the like based on the following formula (a). The average fiber length is measured by a weight average fiber length (Lw).

Assuming that the fiber length of each reinforcing fiber is Li and the number of measured fibers is j, a number average fiber length (Ln) and a weight average fiber length (Lw) can be determined by the following formulae (a) and (b).

$$Ln = \Sigma Li/j \quad \text{Formula (a)}$$

$$Lw = (\Sigma Li^2)/(\Sigma Li) \quad \text{Formula (b)}$$

When the fiber length is constant, the number average fiber length and the weight average fiber length have the same value.

Extraction of the reinforcing fibers from the molded body can be performed, for example, by subjecting the molded body to a heat treatment at 500° C. for about 1 hour and removing the resin in a furnace.

[Volume Fraction VfA of Fibers in the Material A and Volume Fraction VfB of Fibers in the Material B]

In the present invention, a volume fraction of the fibers in the material A or the material B is not particularly limited, but the formulae (1) and (5) are preferably satisfied.

$$0.01 \leq Xa/Xb < 1 \quad \text{Formula (1)}$$

$$0.3 \leq VfA/VfB \leq 3.0 \quad \text{Formula (5)}$$

For the upper limit of the formula (5), VfA/VfB≤1.6 is more preferable, VfA/VfB≤1.0 is still more preferable, and VfA/VfB≤0.8 is yet still more preferable.

For the lower limit of the formula (5), 0.4≤VfA/VfB is more preferable, 0.5≤VfA/VfB is still more preferable, and 0.6≤VfA/VfB is yet still more preferable, When formula (5) is satisfied, the problem of warpage can be further solved.

The volume fraction of fibers is defined by the following formulae (c) and (d). In the present specification, the volume fraction of fibers of the material A or the material B may be referred to as VfA or VfB, respectively.

Volume fraction of fibers (VfA)=100×(volume of carbon fibers)/((volume of carbon fibers)+(volume of thermoplastic resin of material A))   Formula (c)

Volume fraction of fibers (VfB)=100×(volume of glass fibers)/((volume of glass fibers)+(volume of thermoplastic resin of material B))   Formula (d)

More specifically, the volume fraction of fibers (VfA) is preferably 10 vol % or more and 60 vol % or less, more preferably 20 or more and 50 vol % or less, and still more preferably 25 vol % or more and 45 vol % or less.

The volume fraction of fibers (VfB) is preferably 10 vol % or more and 60 vol % or less, more preferably 20 vol % or more and 50 vol % or less, and still more preferably 25 vol % or more and 45 vol % or less.

When volume fraction of reinforcing fibers (VfA, VfB) in the material A or the material B is 10 vol % or more, desired mechanical properties are easily obtained. On the other hand, when the volume fraction of reinforcing fibers (VfA, VfB) does not exceed 60 vol %, the fluidity at the time of use in press-molding or the like is good, and a desired molded body shape is easily obtained.

[Fiber Form of Material A]

1. Bundle Form

The carbon fiber is a discontinuous fiber having a fiber length of 5 mm or more, and preferably includes a carbon fiber a1 having a fiber bundle of less than 0.3 mm and a carbon fiber bundle a2 having a bundle width of 0.3 mm or more and 3.0 mm or less. A volume fraction of the carbon fiber bundle a2 in the carbon fibers contained in the material A is preferably 5 vol % or more and less than 95 vol %, and more preferably 10 vol % or more and less than 90 vol %.

2. Dispersion

In the material A, the carbon fibers are preferably dispersed in an in-plane direction. The in-plane direction is a direction orthogonal to a plate thickness direction of the molded body, and means an indefinite direction in a parallel surface orthogonal to the plate thickness direction.

Further, it is preferable that the carbon fibers are randomly dispersed in two-dimensional directions in in-plane directions. When the material A is compression-molded without flowing, the form of the carbon fibers is substantially maintained before and after molding. Therefore, it is preferable that the carbon fibers contained in the molded body obtained by molding the material A are also two-dimensionally and randomly dispersed in the in-plane direction of the molded body.

Here, two-dimensionally and randomly dispersed refers to a state in which the carbon fibers are not oriented in a specific direction such as one direction in the in-plane direction of the molded body, but are oriented in a disordered manner, and are arranged in a sheet plane without exhibiting a specific directivity as a whole. The material A (or molded body) obtained by using the discontinuous fibers dispersed two-dimensionally and randomly is a substantially isotropic material A (or molded body) having no in-plane anisotropy.

A degree of two-dimensional random orientation is evaluated by determining a ratio of tensile elastic moduli in two directions orthogonal to each other. When a ratio (Eδ) obtained by dividing a larger value of the measured values of the tensile elastic modulus by a smaller value is 5 or less, more preferably 2 or less, and still more preferably 1.5 or less in any direction of the molded body and a direction orthogonal thereto, it can be evaluated that the carbon fibers are dispersed two-dimensionally and randomly. Since the molded body has a shape, it is preferable to heat the molded body to a softening temperature or higher to return the molded body to a flat plate shape and solidify the molded body, as a method of evaluating the two-dimensional random dispersion in the in-plane direction. After that, when a test piece is cut out and the tensile elastic modulus is obtained, the random dispersion state in the two-dimensional direction can be confirmed.

[Fiber Form of Material B]

In the material B, the glass fibers are preferably dispersed in an in-plane direction. The in-plane direction is a direction orthogonal to a plate thickness direction of the molded body, and means an indefinite direction of a parallel surface orthogonal to the plate thickness direction.

Further, it is preferable that the glass fibers are randomly dispersed in the two-dimensional direction in the in-plane direction. When the material B is compression-molded without flowing, the form of the glass fibers is substantially maintained before and after molding. Therefore, it is preferable that the glass fibers contained in the molded body obtained by molding the material B are also two-dimensionally and randomly dispersed in the in-plane direction of the molded body.

Here, two-dimensionally and randomly dispersed refers to a state in which the glass fibers are not oriented in a specific direction such as one direction in the in-plane direction of the molded body, but are oriented in a disordered manner, and are arranged in a sheet plane without exhibiting a specific directivity as a whole. The material B (or molded body) obtained by using the discontinuous fibers dispersed two-dimensionally and randomly is a substantially isotropic material B (or molded body) having no in-plane anisotropy.

A degree of two-dimensional random orientation is evaluated by determining a ratio of tensile elastic moduli in two directions orthogonal to each other. When a ratio (Eδ) obtained by dividing a larger value by a smaller value of the values of the tensile elastic moduli measured in any direction and in a direction orthogonal to the any direction of the molded body is 5 or less, more preferably 2 or less, and still more preferably 1.5 or less, it can be evaluated that the glass fibers are dispersed two-dimensionally and randomly. Since the molded body has a shape, it is preferable to heat the molded body to a softening temperature or higher to return the molded body to a flat plate shape and solidify the molded body, as a method of evaluating the two-dimensional random dispersion in the in-plane direction. After that, when a test piece is cut out and the tensile elastic moduli are obtained, the random dispersion state in the two-dimensional direction can be confirmed.

[Thermoplastic Resin M1]

The type of the thermoplastic resin M1 in the present invention is not particularly limited, and a thermoplastic resin having a desired softening point or melting point can be appropriately selected and used. As a thermoplastic matrix resin, a thermoplastic matrix resin having a softening point in a range of 180° C. to 350° C. is generally used, but the thermoplastic matrix resin is not limited thereto.

Examples of the thermoplastic resin M1 include a vinyl chloride resin, a vinylidene chloride resin, a vinyl acetate resin, a polyvinyl alcohol resin, a polystyrene resin, an acrylonitrile-styrene resin (AS resin), an acrylonitrile-butadiene-styrene resin (ABS resin), an acrylic resin, a methacrylic resin, a polyethylene resin, a polypropylene resin, various thermoplastic polyamide resins, a polyacetal resin, a polycarbonate resin, a polyethylene terephthalate resin, a polyethylene naphthalate resin, a polybutylene naphthalate resin, a polybutylene terephthalate resin, a polyarylate resin, a polyphenylene ether resin, a polyphenylene sulfide resin, a polysulfone resin, a polyether sulfone resin, a polyether ether ketone resin, and a polylactic acid resin.

The thermoplastic resin in the present invention may be a crystalline resin or an amorphous resin. In the case of a crystalline resin, specific examples of a preferable crystalline resin include a polyamide resin such as nylon 6, a polyethylene terephthalate resin, a polybutylene terephthalate resin, a polyethylene resin, a polypropylene resin, a polyacetal resin, and a polyphenylene sulfide resin. Among these, a polyamide resin, a polybutylene terephthalate resin, and a polyphenylene sulfide resin are preferably used because of excellent heat resistance and mechanical strength.

As nylon (hereinafter, may be abbreviated as "PA") which is one of the polyamide resin, at least one selected from the group consisting of PA6 (also known as polycaproamide, polycaprolactam, poly(ε-caprolactam)), PA26 (polyethylene adipamide), PA46 (polytetramethylene adipamide), PA66 (polyhexamethylene adipamide), PA69 (polyhexamethylene adipamide), PA610 (polyhexamethylene sebacamide), PA611 (polyhexamethylene undecamide), PA612 (polyhexamethylene dodecamide), PA1 (polyundecamide), PA12 (polydodecamide), PA1212 (polydodecamethylene dodecamide), PA6T (polyhexamethylene terephthalamide), PA6I (polyhexamethylene isophthalamide), PA912 (polynonamethylene dodecamide), PA1012 (polydecamethylene dodecamide), PA9T (polynonamethylene terephthalamide), PA9I (polynonamethylene isophthalamide), PA10T (polydecamethylene terephthalamide), PA10I (polydecamethylene isophthalamide), PA11T (polyundecamethylene terephthalamide), PA11I (polyundecamethylene isophthalamide), PA12T (polydodecamethylene terephthalamide), PA12I (polydodecamethylene isophthalamide), and polyamide MXD6 (polymetaxylylene adipamide) is preferable.

[Thermoplastic Resin M2]

Similarly to the thermoplastic resin, the type of the thermoplastic resin M2 in the present invention is not particularly limited, and a thermoplastic resin having a desired softening point or melting point can be appropriately selected and used. As a thermoplastic matrix resin, a thermoplastic matrix resin having a softening point in a range of 180° C. to 350° C. is generally used, but the thermoplastic matrix resin is not limited thereto.

The thermoplastic resin M2 may be the same type as the thermoplastic resin M1. The thermoplastic resin M2 may have a smaller linear expansion coefficient than that of the thermoplastic resin M1 such that the ratio Xa/Xb is adjusted to $0.8 \leq Xa/Xb \leq 1$, where Xa is the linear expansion coefficient of the material A, and Xb is the linear expansion coefficient of the material B.

[Linear Expansion Relaxation Agent]

A linear expansion relaxation agent may be mixed into the material A and/or the material B such that $0.8 \leq Xa/Xb \leq 1$ is satisfied, where Xa is the linear expansion coefficient of the material A, and Xb is the linear expansion coefficient of the material B.

[Other Agent]

The material A or the material B used in the present invention may contain additives such as various fibrous or non-fibrous fillers of organic fibers or inorganic fibers, a flame retardant, an UV resistant agent, a stabilizer, a release agent, a pigment, a softener, a plasticizer, a surfactant, and a hollow glass bead as long as the objects of the present invention are not impaired.

[Measurement Direction of Linear Expansion Coefficient]

Figure 13:
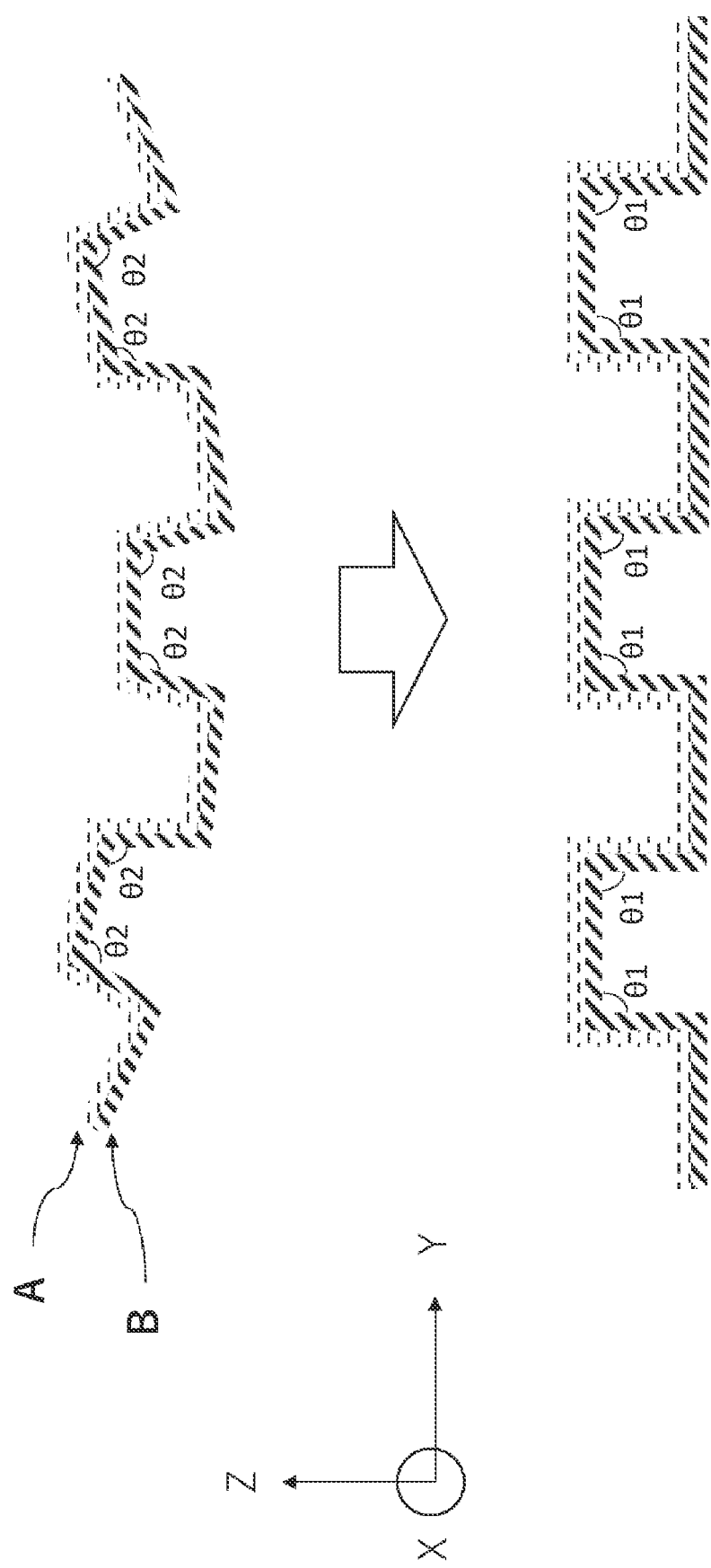
FIG. 13 is a schematic view showing a phenomenon of warping with a lapse of time from immediately after formation of the molded body.

The "warpage" at the time when the molded body is compression-molded is a phenomenon in which the molded body is deformed when the temperature of the molded body is decreased as time has passed immediately after the completion of compression-molding, and is typically a phenomenon caused by being pulled toward the material B having a larger linear expansion coefficient as the time passes immediately after the production of the molded body. For example, the "warpage" is a phenomenon in which an end portion of the molded body in a corrugated direction (wave direction) is deformed downward in a Z-axis direction as in the molded body immediately after the production as shown in an upper part of FIG. 13. This is because the material A and the material B have different linear expansion coefficients in the wave direction (a direction in which one side wall and the other side wall of a pair of side walls face each other, for example, the wave direction of the molded body in a lower part of FIG. 13 is a Y-axis direction). Therefore, the linear expansion coefficient is defined as follows.

The linear expansion coefficient Xa of the material A is a linear expansion coefficient of the material in a direction that becomes the wave direction when the molded body is formed.

The linear expansion coefficient Xb of the material B is a linear expansion coefficient of the material in the direction that becomes the wave direction when the molded body is formed.

The linear expansion coefficient Xc of the material C is a linear expansion coefficient of the material in a direction that becomes a wave direction when the molded body is formed.

Since the linear expansion coefficient of the material (especially when non-fluid molding is performed) and the linear expansion coefficient of the material after forming the molded body are almost the same, the linear expansion coefficient of the material may be measured, or the linear expansion coefficient may be measured by sampling from the molded body. When sampling from the connecting wall of the molded body, the direction of sampling is a wave direction in FIG. 13 (a Y-axis direction in FIG. 13), but when sampling from the standing wall (side wall), the direction of sampling is a path direction (a Z-axis direction in FIG. 13) rather than the wave direction (the Y-axis in FIG. 13).

[Relationship Between Material and Molded Body]

In the present invention, the material is a material for forming a molded body, and the material A and the material B (or other layers such as the material C) are formed into a molded body by compression-molding. Therefore, the material A and the material B in the present invention preferably have a flat plate shape. On the other hand, the molded body is shaped into a three-dimensional shape.

When compression-molding (in particular, cold-pressing) is performed using a thermoplastic resin, a form of the reinforcing fibers is substantially maintained before and after molding, and therefore, when the form of the carbon fibers or the glass fibers contained in the molded body is analyzed, it can be understood What the form of the carbon fibers in the material A or the glass fibers in the material B is. When the material is formed without flowing (non-flowing forming) in the cold-pressing, the form of fibers is substantially unchanged.

[Molded Body]

1. Side Walls and Connecting Wall

The molded body according to the present invention includes a pair of side walls and a connecting wall that is connected to the side walls.

Figure 4:
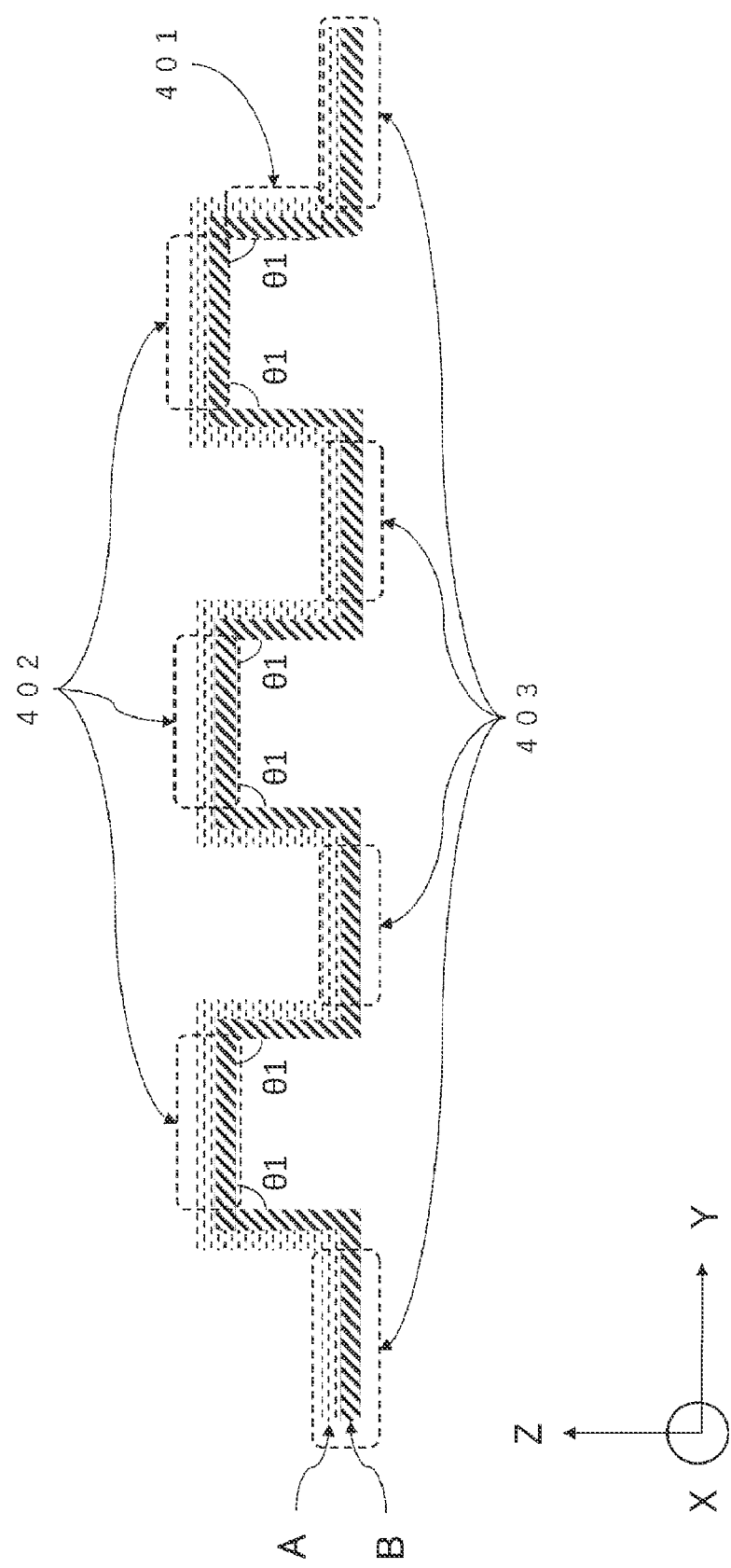
FIG. 4 is a schematic view showing an example of a molded body produced by the producing method of the present invention.
Figure 5B:
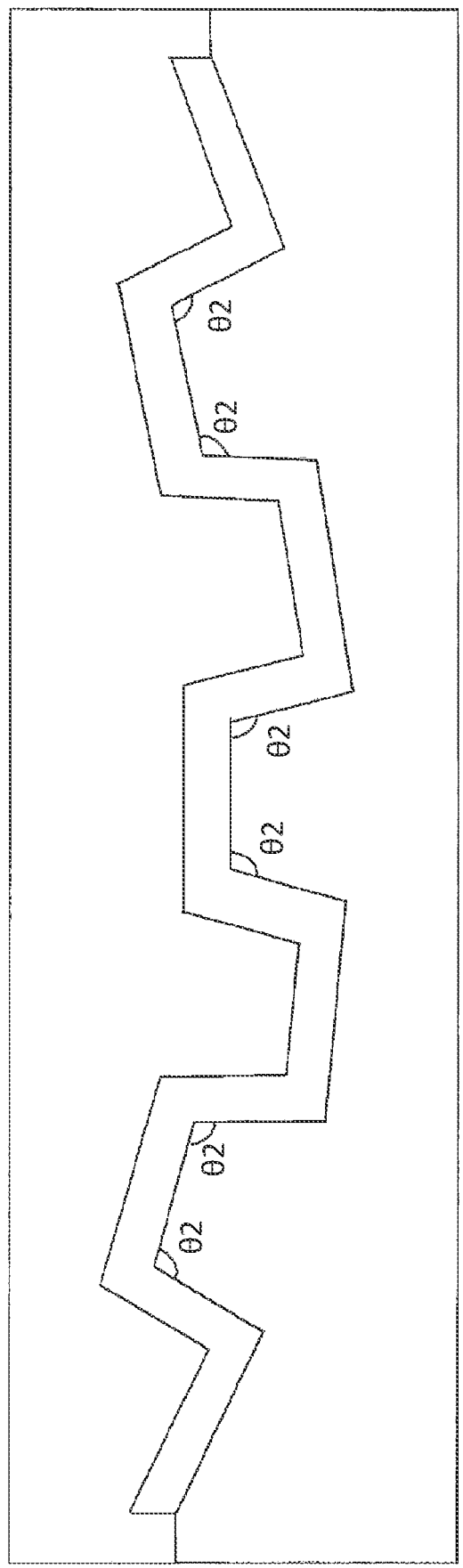
FIG. 5B is a schematic view showing a closed state of the pair of female and male molds.

The side walls are, for example, 101 and 401 in FIGS. 1 and 4. The connecting wall is, for example, 102, 402, and 403 in FIGS. 1 and 4. As shown in FIGS. 1 and 4, the connecting wall connects the pair of side walls.

As shown in FIG. 4, the connecting wall is a concept including a connecting wall (402) of an upper wall and a connecting wall (403) of a lower wall. The upper wall (402 in FIG. 4) refers to a connecting wall located on an upper side when the molded body is left to stand such that the material B present in the surface layer is located on a lower side. The lower wall (403 in FIG. 4) refers to a connecting wall located on the lower side when the molded body is left to stand such that the material B present in the surface layer is located on the lower side.

2. Wave Shape

The molded body in the present invention has a wave shape in cross section. Here, the cross section of the wave shape may have a single wave shape as shown in the cross-sectional view in FIG. 1. The molded body preferably has a plurality of wave shapes (for example, FIG. 4) in cross section. It is preferable that a length in the wave direction is 1 m or more. It is more preferable that the molded body has a plurality of wave shapes in cross section and the length in the wave direction is 1 m or more. Here, the wave direction is, for example, the Y-axis direction in FIG. 4. The molded body having a wave shape in cross section refers to a molded body in which a wave can be observed when a cross section of the molded body is observed. It is general to observe in an in-plane direction (a direction perpendicular to a thickness direction).

3. Flatness Fa and Height h of Side Wall

A relationship between a flatness Fa of the molded body and a height h of the side wall of the present invention satisfies $0 \leq Fa/h < 1.3$.

3.1

The flatness Fa of the present invention is defined by the following procedures 1 to 5.

(Procedure 1) The molded body is left to stand such that the material present in the surface layer is on the lower side.

(Procedure 2) The cross section of the molded body is observed such that the cross section appears to have a wave shape, and the observation range of the molded body is cut out such that the length Ly in the wave direction is 40 cm.

(Procedure 3) Pay attention to a bottom surface of the lower wall formed by the connecting wall.

(Procedure 4) Two parallel ideal straight lines are drawn with a minimum width necessary to include the entire bottom surface of the lower wall.

(Procedure 5) A distance between the ideal straight lines is defined as the flatness Fa. Procedures 1 to 5 will be described with reference to FIGS. 9A to 9C.

FIGS. 9A to 9C shows a molded body that has been left to stand such that the material B present in the surface layer is on the lower side. The surface layer of the molded body on the lower side of the drawing is covered with the material B. The Y-axis direction in FIG. 9A is the wave direction. In FIG. 9A, the observation range of the molded body is cut out such that the length Ly is 40 cm, and the cross section of the wave shape is observed (procedure 2). The lower wall of the connecting wall is a region indicated by 902 in FIG. 9B. In addition, the bottom surface of the lower wall is a surface indicated by 903 in FIG. 9C (procedure 3). The two parallel ideal straight lines are shown by 901 in FIG. 9A. The two parallel ideal straight lines (901) are drawn such that the distance therebetween is minimized (two parallel ideal straight lines are drawn with a minimum necessary width).

It should be noted that a measuring method by observing the molded body in a state where a top and bottom of the molded body in FIGS. 9A to 9C are reversed and the surface of the molded body on the lower side in the drawing is covered with the material A (in a state in which the material A is in contact with a desk) is not adopted in the present invention.

In the case where Fa varies depending on a location where the length Ly in the wave direction is cut out, Fa should be designed so as to satisfy $0 \leq Fa/h < 1.3$ even at one location.

3.2.

Figure 10:
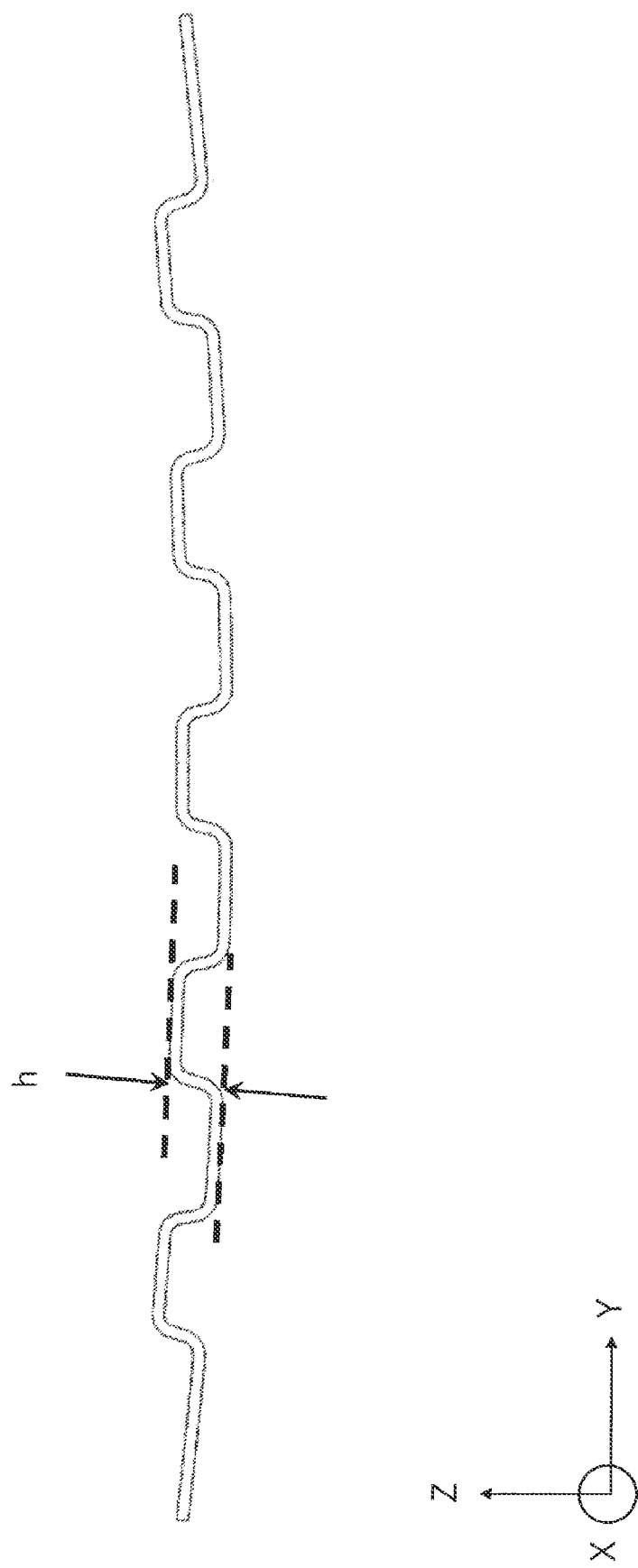
FIG. 10 is a schematic view showing a height h of the side wall.

The height h of the side wall of the present invention is shown by h in FIG. 10, which indicates a distance between the upper wall and the lower wall when observing the cross section of the wave shape. More specifically, when observing the upper wall and the lower wall directly connected to one side wall, the distance between the two parallel ideal straight lines having a minimum width necessary to include all of the upper wall and the lower wall is the height h. The two dotted lines drawn in FIG. 10 are drawn such that the distance between the two dotted lines is minimized.

When the molded body has a plurality of heights h, at least one h may satisfy 0≤Fa/h<1.3.

3.3

When Fa/h=0 is satisfied, the lower wall of the molded body is an ideal plane. When Fa/h<1.3 is satisfied, it is easy to assemble, for example, an automobile in combination with other components. 0≤Fa/h≤1.0 is preferable, 0≤Fa/h≤0.7 is more preferable, 0≤Fa/h≤0.4 is still more preferable, and 0≤Fa/h≤0.1 is yet still more preferable.

4. Angle $\theta 1$

In the molded body, an angle $\theta 1$ between the side wall and the connecting wall on the side where the material B is present in the surface layer preferably satisfies 90°≤$\theta 1$<160°. The angle $\theta 1$ between the side wall and the connecting wall on the side where the material B is present in the surface layer is indicated by $\theta 1$ in FIGS. 1 and 4, for example. That is, the angle $\theta 1$ can be measured when the cross section of the wave shape is observed.

In addition, the molded bodies in FIGS. 1 and 4 have a plurality of $\theta 1$ at the same angle. When there are a plurality of angles $\theta 1$, but the angles are different from each other, the smallest angle among the angles between the side wall and the connecting wall on the side where the material B is present in the surface layer is defined as the angle $\theta 1$.

The range of the angle $\theta 1$ is more preferably 95°≤$\theta 1$<135°, even more preferably 95°≤$\theta 1$<125°, and still more preferably 98°≤$\theta 1$<120°.

5. Angle Change Due to Difference in Linear Expansion Coefficient

Since the material A of the present invention contains the carbon fibers and the material B of the present invention contains the glass fibers, there is a difference in the linear expansion coefficient between the material A and the material B. When the conditions other than the fiber type are the same (VfA=VfB, the types of the thermoplastic resins M1 and M2 are the same, and the like), Xa/Xb<1 is satisfied, where Xa is the linear expansion coefficient of the material A, and Xb is the linear expansion coefficient of the material B.

In a case where there is a difference between the linear expansion coefficients of the material A and the material B, the layer having a large linear expansion coefficient pulls the layer having a small linear expansion coefficient when the material A and the material B are laminated to form a molded body in a wave shape at a temperature higher than room temperature. Specifically, when Xa/Xb<1 is satisfied, the material B pulls the material A. Therefore, for example, in FIGS. 3A, 3B, 6A and 6B, both end portions of the molded body (in the wave direction) warp downward with a lapse of time immediately after the completion of compression-molding. As a result, the angle between the side wall and the connecting wall on the side where the material B is present in the surface layer changes (sometimes referred to as an angle change) between immediately after molding and after a lapse of a while. In order to set the angle $\theta 1$ of the molded body to a target angle, it is necessary to predict in advance how much the angle changes.

Regarding the change in angle (angle change) after a lapse of time from immediately after molding, the problem of warpage of the entire molded body becomes significant as the length in the wave direction increases (specifically, when the length in the wave direction is 1 m or more) and as the number of angles $\theta 1$ increases. By using the preferred producing method of the present invention, a molded body having a small Fa/h value can be produced even with such a remarkable problem.

6. Rib

Figure 7A:
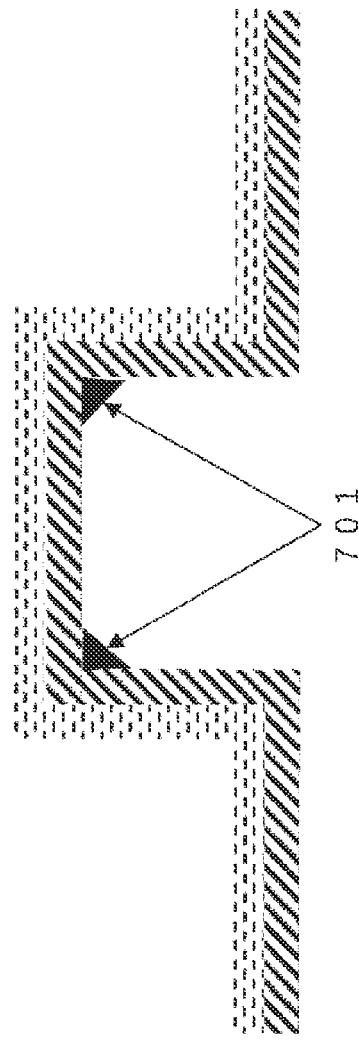
FIG. 7A is a schematic view showing a molded body having a rib between a connecting wall and a side wall.
Figure 7B:
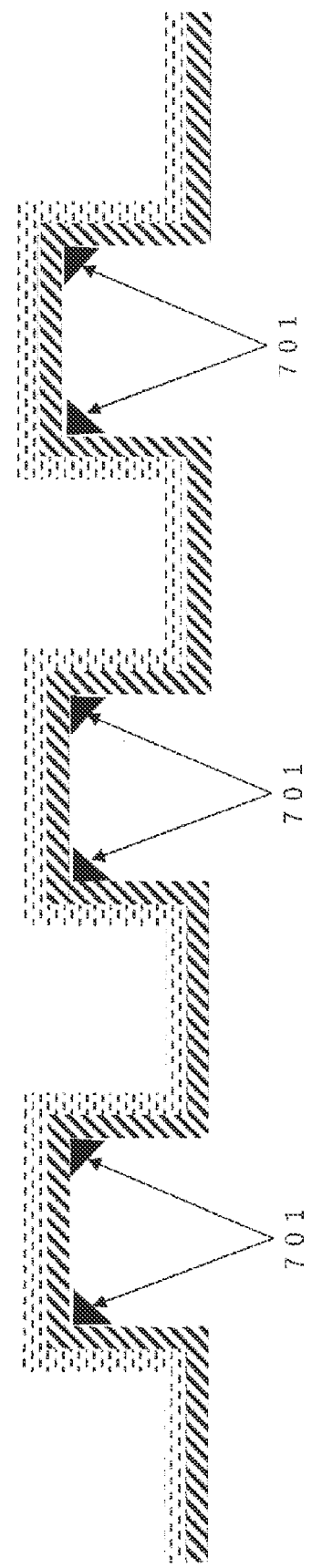
FIG. 7B is a schematic view showing a molded body having a rib between a connecting wall and a side wall.

The molded body in the present invention preferably has a rib between the connecting wall and the side wall. The rib is shown by 701 in FIGS. 7A and 7B, for example. By providing the rib, even when the material A and the material B which have a difference in the linear expansion coefficient are compression-molded, the material A and the material B are less likely to warp.

[Joined Body]

Figure 8A:
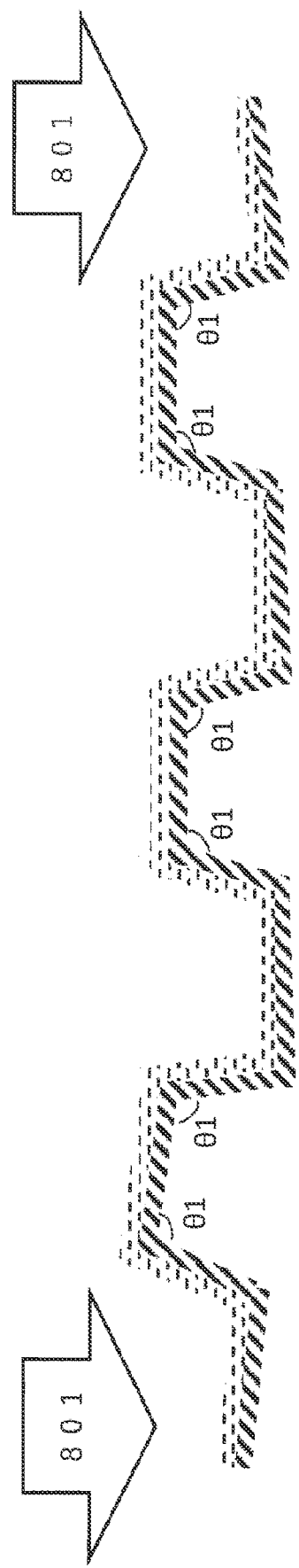
FIG. 8A is a schematic view showing that a molded body is joined to a separate component in a state where an angle θ1 is stress-deformed to be an angle θ3, thereby producing a joined body.
Figure 8B:
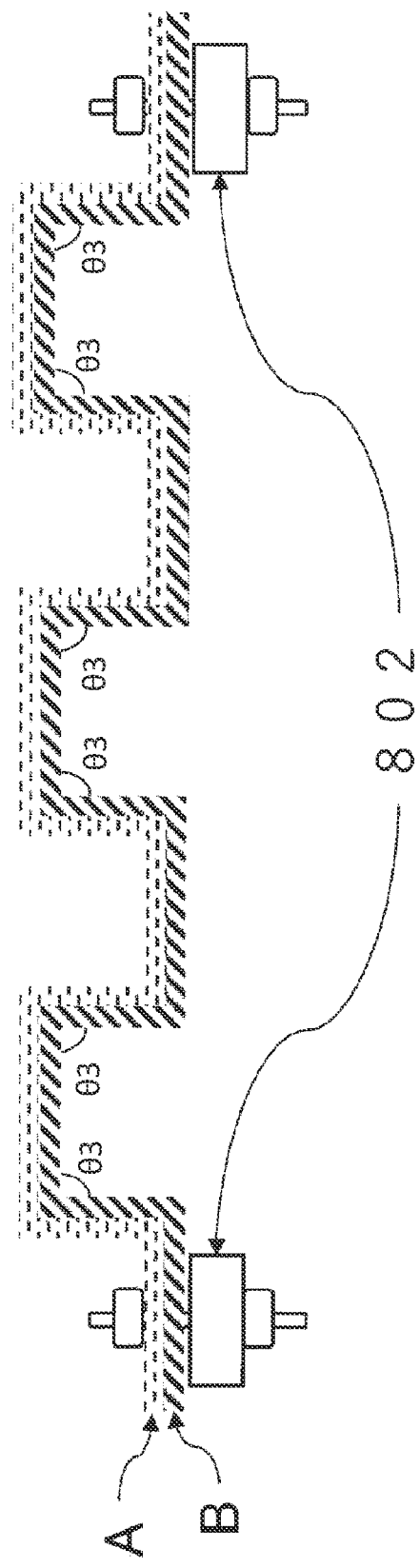
FIG. 8B is a schematic view showing that the molded body is joined to a separate component in a state where the angle θ1 is stress-deformed to be an angle θ3, thereby producing a joined body.

The molded body may be joined to a separate component to manufacture a joined body in a state in which the angle $\theta 1$ is reduced by stress deformation and the relationship between the flatness Fa' of the molded body after stress deformation and the height h of the side wall satisfies 0≤Fa'/h<0.1. For example, a slightly warped molded body as shown in FIG. 8A may be joined to a separate component (802 in FIG. 8B) after stress is applied to the molded body as indicated by an arrow 801 in FIG. 8A. Here, the flatness Fa' means the flatness of the molded body in a joined state. The joining may be performed by bolting as shown in FIG. 8B, or may be performed by joining with an adhesive.

[Compression-Molding]

Figure 6A:
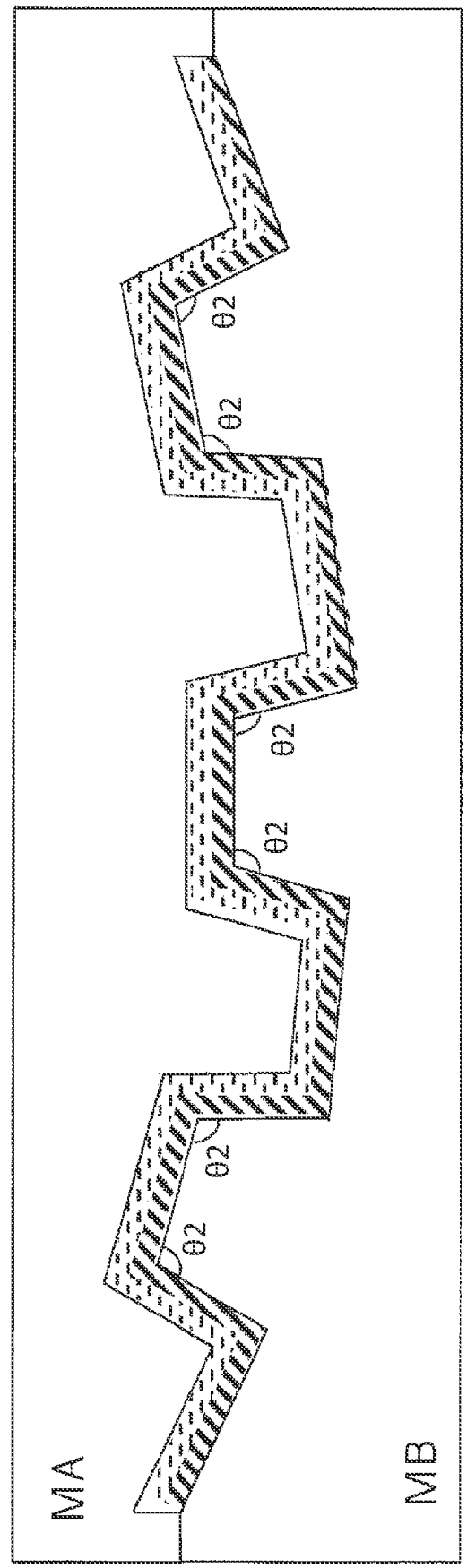
FIG. 6A is a schematic view showing a state in which the material (A) and the material (B) are laminated and compression-molded by a mold.
Figure 6B:
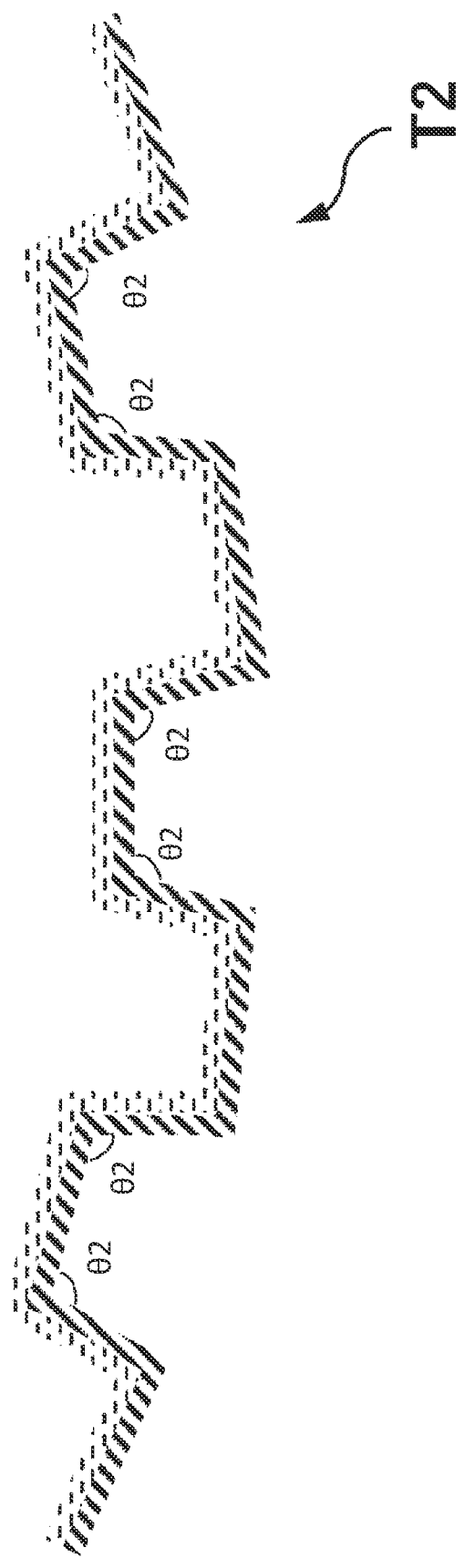
FIG. 6B is a schematic view showing a molded body taken out from the mold.

The present invention is a method for producing a molded body including: bringing a material A into contact with a mold MA; bringing a material B into contact with a mold MB; and compression molding the material A and the material B using the mold MA and the mold MB which are a pair of male and female molds. FIGS. 3A and 6A show a state in which the material A is in contact with the mold MA and the material B is in contact with the mold MB. Here, the mold MA and the mold MB are a pair of female and male molds. The mold MA is not a pair of male and female molds, the mold MB is not a pair of male and female molds. The mold MA and the mold MB are each one of a pair of molds, meaning that the mold MA and the mold MB form a pair of female and male molds. In addition, for example, as shown in FIGS. 2A and 2B, one of the pair of molds may have a male part, and the other of the pair of molds may have a female part. Male and female (concave or convex) may be provided in each of the molds.

1. Upper and Lower of Mold

The upper and lower of the mold MA and the mold MB are not particularly limited, but it is preferable that the mold MA is an upper mold and the mold MB is a lower mold. More preferably, the compression-molding is cold-pressing, the mold MA is an upper mold, and the mold MB is a lower mold. The reason will be described below.

(Reason 1)

In the case of the cold-pressing, since temperatures of the upper and lower molds are lower than those of the material A and the material B, the thermoplastic resin contained in the material solidifies at the moment when the material comes into contact with the molds. Since the material A is a layer containing carbon fibers, the material A has high thermal conductivity. The material A is more easily cooled than the material B containing glass fibers under the same conditions (resin, additive, Vf, and the like are the same) and thus the material A has poor fluidity. Therefore, how to prevent the temperature decrease of the material A is a problem in the case of the cold-pressing.

When cold-pressing a material in which the material A and the material B are laminated, it is preferable to ensure that the material A is not brought into contact with the mold MA until immediately before the start of compression in order to ensure fluidity. For that purpose, it is preferable to place the material B in contact with the lower mold MB and place the material A in contact with the upper mold for the compression-molding. In this case, the material A does not come into contact with the mold until just before compression-molding, which makes it easier to prevent a temperature decrease.

(Reason 2)

Since the material A contains carbon fibers, the appearance is beautiful, and when the material A is present on the surface, the appeal to the customer is high. In particular, when the material A has a grain, the design property thereof is particularly significant. In order to form the grain on the material A, it is necessary to perform compression-molding immediately after the material A comes into contact with the mold MA. At this time, the mold MA is the upper mold.

2. Compression-Molding

The compression-molding can be performed by a molding method such as hot press-molding or cold press-molding, and compression-molding using cold press-molding is particularly preferable. In the cold press-molding, for example, a molded body heated to a first predetermined temperature is put into a mold set to a second predetermined temperature, and then pressurized and cooled.

Specifically, when the thermoplastic resins constituting the material A and the material B (in some cases, the material C and the like) are of the same type and are crystalline, the first predetermined temperature is equal to or higher than the melting point, and the second predetermined temperature is lower than the melting point. When the thermoplastic resins are of the same type and are amorphous, the first predetermined temperature is equal to or higher than the glass transition temperature, and the second predetermined temperature is lower than the glass transition temperature.

When the thermoplastic resin is a different resin, the first predetermined temperature is determined based on the higher melting point or glass transition temperature of the resin, and the second predetermined temperature is determined based on the lower melting point or glass transition temperature of the resin.

That is, the cold-pressing method includes at least the following steps A2) to A1), Step A1) heating the material to the first predetermined temperature Step A2) placing the material heated in step A1) in a mold adjusted to the second predetermined temperature, and pressurizing the material By performing these steps, the molding of the molded body can be completed.

Each of the steps described above needs to be performed in order described above, but other steps may be included between the steps. Other steps include, for example, prior to step A2), a shaping step of shaping the material in advance into a shape of a cavity of the mold using a shaping mold different from the mold used in step A2). Step A2) is a step of applying pressure to the material to obtain a molded body having a desired shape. The molding pressure at this time is not particularly limited, but is preferably less than 20 MPa, and more preferably 10 MPa or less with respect to a projected area of the mold cavity.

As a matter of course, various steps may be inserted between the above steps during compression-molding, and for example, vacuum press molding in which compression-molding is performed under vacuum may be used.

3. Preferable Temperature of Mold

A temperature to of the mold MA and a temperature tb of the mold MB may be room temperature +10° C. or less, or may be room temperature or more and room temperature +10° C. or less. In this case, since the molded body has a temperature close to room temperature at the same time as the completion of the molding, and there is no shrinkage of each layer due to a temperature difference between the molded body and room temperature, the problem of warpage is less likely to occur even when there is a difference in the linear expansion coefficient between the material A and the material B.

[Mold for Compression-Molding]

1. Angle $\theta 2$

It is preferable that the mold MB includes a mold surface S1 for forming the connecting wall and a mold surface S1 for forming the side wall, and an angle $\theta 2$ between S1 and S2 satisfies $\theta 1 < \theta 2$.

For the angle $\theta 2$, an obtuse angle portion of the angle between S1 and S2 is measured. For example, in FIGS. 3A, 3B, 6A and 6B, an obtuse angle portion of the lower mold (mold MB) with which the material B comes into contact is measured.

The mold cavity preferably has a wave shape in cross section, and the angle $\theta 2$ can be measured when the cavity of the molded body is observed in the wave shape in cross section.

In addition, the cavity of the molded body in FIGS. 3A, 3B, 6A and 6B has a plurality of $\theta 2$ at the same angle. When there are a plurality of angles $\theta 2$, and the angles are different from each other, the angle $\theta 2$ is the smallest angle among the angles between the mold surface S1 and the mold surface S2.

The range of $\theta 2$ is more preferably $0° \leq \theta 2 - \theta 1 < 10°$, still more preferably $0° \leq \theta 2 - \theta 1 < 5°$, and still more preferably $\theta 2 - \theta 1 = 0°$.

2. Angle Change Due to Difference in Linear Expansion Coefficient

Since the material A contains the carbon fibers and the material B of the present invention contains the glass fibers, there is a difference in the linear expansion coefficient between the material A and the material B. When the conditions other than the fiber type are the same (VfA=VfB, the types of the thermoplastic resins M1 and M2 are the same, and the Xa/Xb<1 is satisfied, where Xa is the linear expansion coefficient of the material A, and Xb is the linear expansion coefficient of the material B.

In a case where there is a difference between the linear expansion coefficients of the material A and the material B, the layer having a larger linear expansion coefficient pulls the layer having a smaller linear expansion coefficient when the material A and the material B are laminated to form a molded body in a wave shape. Specifically, when Xa/Xb<1, the material B pulls the material A. Therefore, for example, in FIGS. 3A, 3B, 6A and 6B, the end portion of the molded body in the wave direction warps downward with a lapse of time immediately after the molded body is produced. As a result, the angle between the side wall on the side where the material B is present in the surface layer and the connecting wall changes (sometimes referred to as an angle change) between immediately after the molded body and after a lapse of a while. In order to set the angle $\theta 1$ of the molded body to a target angle, it is preferable to predict in advance how much the angle changes, bend the molded body in advance by the angle change as an angle of $\theta 2 - \theta 1$, and press-mold the molded body.

3. Angles $\theta 1$ and $\theta 2$ and Linear Expansion Coefficients Xa and Xb

The present inventors succeeded in predicting the angle $\theta 2 - \theta 1$ corresponding to the angle change, where Xa is the linear expansion coefficient of the material A, and Xb is the linear expansion coefficient of the material B. That is, Xa, Xb, θ1, and θ2 preferably satisfy the following formulae (1) and (2).

$$0.01 \leq Xa/Xb < 1 \quad \text{Formula (1)}$$

$$0 \leq (\theta 2 - \theta 1) \div (Xa/Xb) < 1.0 \times 10^3 \quad \text{Formula (2)}$$

An upper limit of Formula (2) is more preferably less than 65, still more preferably less than 15, and still more preferably less than 10.

4. Flatness Fc of Mold Cavity 4.1

The flatness Fc of the present invention is defined by the following procedures 1' to 5'.

(Procedure 1') The mold cavity is observed such that the mold in contact with the material B is the lower mold.

(Procedure 2') The cross section of the mold cavity having a wave shape was observed, and the observation range of the mold cavity is cut out such that the length Lyc in the wave direction is 40 cm.

(Procedure 3') Attention is paid to a mold surface for forming the lower wall.

(Procedure 4') Two parallel ideal straight lines are drawn with a minimum width necessary to include the entire mold surface for forming the lower wall.

(Procedure 5') The distance between the ideal straight lines is defined as the flatness Fc.

Procedure 1' to procedure 5' will be described with reference to FIG. 12.

Figure 12:
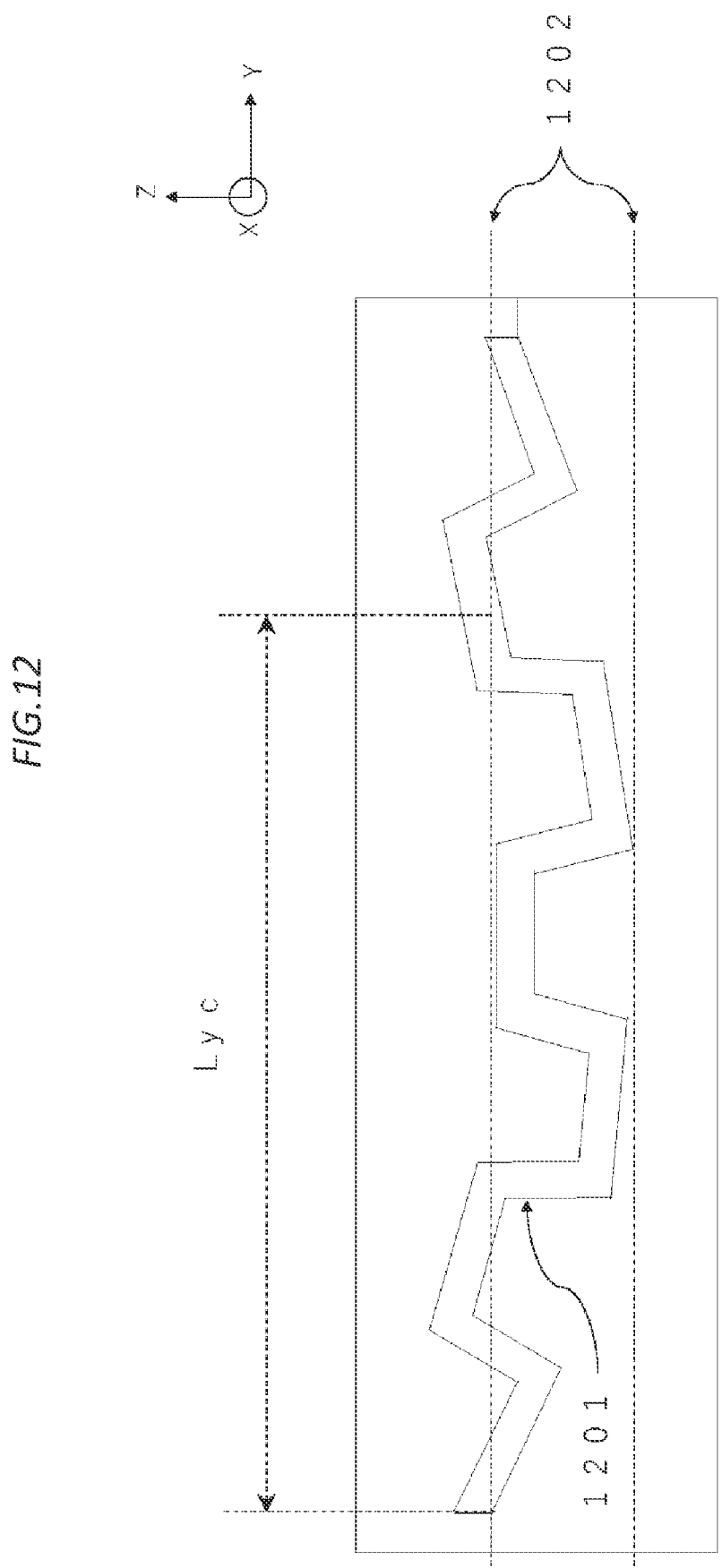
FIG. 12 is a schematic view showing a method of measuring a flatness Fc of a mold cavity.

In FIG. 12, the mold cavity is observed such that the mold MB in contact with the material B is the lower mold. The Y-axis direction in FIG. 12 is the wave direction. The cross section of the mold cavity having the wave shape is observed, and the observation range of the mold cavity is cut out such that the length Lyc in the wave direction is 40 cm. The mold surface for forming the lower wall is 1201 in FIG. 12. The two parallel ideal straight lines are shown by 1202 in FIG. 12. The two parallel ideal straight lines (1202) are drawn such that the distance therebetween is minimized.

In the case where Fc changes depending on the location where the length Lyc in the wave direction is cut out, it is preferable to design Fc so as to satisfy Fa<Fc or formula (3) even at one location.

4.2

The flatness Fc of the mold cavity used for compression-molding preferably satisfies Fa<Fc. Fa<Fc means that the molded body is closer to a plane than the mold cavity.

In a case where there is a difference between the linear expansion coefficients of the material A and the material B, the layer having a larger linear expansion coefficient pulls the layer having a smaller linear expansion coefficient when the material A and the material B are laminated to form a molded body in a wave shape. Specifically, when Xa/Xb<1, the material B pulls the material A. Therefore, for example, in FIGS. 3A, 3B, 6A and 6B, the end portion of the molded body in the wave direction warps downward with a lapse of time immediately after the molded body is produced. As a result, the angle between the side wall and the connecting wall on the side where the material B is present in the surface layer changes between immediately after the molded body and after a lapse of a while, causing an angle change. In order to set the flatness Fa of the molded body to a target range, it is preferable to predict how much the flatness will change in advance, bend the amount of change in flatness (Fc−Fa) in advance, and press-mold the molded body. More specifically, it is more preferable to satisfy the following formulae (1) and (3).

$$0.01 \leq Xa/Xb < 1 \quad \text{Formula (1)}$$

$$0 \leq |Fc - Fa|/h \div (Xa/Xb) < 1.0 \times 10^3 \quad \text{Formula (3)}$$

An upper limit of formula (3) is more preferably less than 5, still more preferably less than 4, yet still more preferably less than 3, and most preferably less than 2.

5. Temperature ta of mold MA, temperature tb of mold MB, and linear expansion coefficients Xa and Xb The relationship between the temperature ta of the mold MA and the temperature tb of the mold MB preferably satisfies the following formulae (1) and (4), where Xa is the linear expansion coefficient of the material A and Xb is the linear expansion coefficient of the material B.

$$0.01 \leq Xa/Xb < 1 \quad \text{Formula (1)}$$

$$0 < |ta - tb| \div (Xa/Xb) < 5000 \quad \text{Formula (4)}$$

An upper limit of formula (4) is preferably 200 or less, more preferably 100 or less, and still more preferably 50 or less. On the other hand, the lower limit of formula (4) is preferably 30 or more.

EXAMPLE

Hereinafter, the present invention will be specifically described with reference to Examples, but the present invention is not limned thereto.

1. Material

Carbon Fiber

Carbon fiber "Tenax" (registered trademark) STS40-24K (EP) (average fiber diameter: 7 μm, fineness: 1600 tex, density: 1.78 g/cm$^3$) manufactured by Teijin, Ltd.

Glass Fiber

Glass fiber EX2500 (average fiber diameter: 15 fiber width: 9 mm) manufactured by Nippon Electric Glass Co., Ltd.

Thermoplastic Resin MA

Polyamide 6 (sometimes abbreviated as A1030, PA6 manufactured by Unitika Ltd.)

Thermoplastic Resin MB

Polyamide 6 (sometimes abbreviated as A1030, PA6 manufactured by Unitika Ltd.)

2. Measurement of Materials

Each value in the present example was determined according to the following method.

(1) Measurement of Volume Fraction (VfA, VfB) of Fibers Contained in Material

A sample of 100 mm×100 mm was cut out from the material A (or the material B), and the sample was heated for 1 hour in a nitrogen atmosphere in an electric furnace (FP410 manufactured by Yamato Scientific Co., Ltd.) heated to 500° C. to burn away an organic substance such as a matrix resin.

Weights of the reinforcing fibers and the thermoplastic resin were calculated by weighing the weights of the samples before and after burning. Next, the volume fraction of the reinforcing fibers was calculated using the specific gravity of each component.

Volume fraction of fibers (VfA)=100×(volume of carbon fibers)/((volume of carbon fibers)+(volume of thermoplastic resin of material A))  Formula (c)

Volume fraction of fibers (VfB)=100×(volume of glass fibers)/((volume of glass fibers)+(volume of thermoplastic resin of material B))  Formula (d)

(2) Linear Expansion Coefficient of Material

After test pieces of the material A and the material B were vacuum dried at 110° C. for 24 hours as a pretreatment, linear expansion coefficients in a direction that becomes a wave direction when a molded body is formed were measured and averaged at random 10 points under the following measurement conditions.

Shape of test piece: 2.5 mm×5 mm×5 mm
Test equipment model: TMA/SS7100 (manufactured by Seiko Instruments Inc.)
Rate of temperature increase: 5° C./min
Test load: compression load 49 mN
Probe diameter: 2.9 mm
Measurement atmosphere: nitrogen atmosphere (100 ml/min)
Test temperature range: 25° C. to 200° C.

3. Cross-Section Observation

Cross sections of the molded body and the mold cavity were observed from a direction in which a wave shape could be observed. More specifically, observation was made from a direction (X-axis direction in FIGS. 1 and 4) that is perpendicular to the wave direction (Y-axis direction in FIGS. 1 and 4) and in which the wave shape could be observed. The direction for observation is also perpendicular to a plate thickness direction (Z-axis direction in FIGS. 1 and 4). In other words, the observation of the wave shape is in a direction perpendicular to the wave direction and the plate thickness direction.

(1) Flatness Fa of Molded Body

The flatness Fa was measured by the following procedure.

(Procedure 1) The molded body was left to stand such that the material B present in a surface layer was on a lower side.

Procedure 2) The cross section of the molded body was observed such that the cross section appeared to have a wave shape, and the observation range of the molded body was cut out such that the length Ly in the wave direction was 40 cm.

(Procedure 3) Attention was paid to a bottom surface of a lower wall formed by the connecting wall.

(Procedure 4) Two parallel ideal straight lines were drawn with a minimum width necessary to include the entire bottom surface of the lower wall.

(Procedure 5) A distance between the ideal straight lines was defined as the flatness Fa.

(2) Flatness Fc of Mold Cavity

The flatness Fe was measured by the following procedure.

(Procedure 1') The mold cavity was observed such that the mold MB in contact with the material B was a lower mold.

(Procedure 2') The cross section of the mold cavity having a wave shape was observed, and the observation range of the cavity of the mold was cut out such that the length Lye in the wave direction was 40 cm.

(Procedure 3') Attention was paid to a mold surface for forming the lower wall.

(Procedure 4') Two parallel ideal straight lines were drawn with a minimum width necessary to include the entire mold surface for forming the lower wall.

(Procedure 5') The distance between the ideal straight lines was defined as flatness Fa.

(3) Angle θ1

The cross section of the molded body having a wave shape was observed, all the angles between the side wall on the side where the material B was present in the surface layer and the connecting wall were measured, and the minimum angle was defined as an angle θ1.

(4) Angle θ2

An angle θ2 between a mold surface S1 for forming the connecting wall and a mold surface S2 for forming the side wall when the mold MB was observed in cross section was designed according to each of Examples and Comparative Examples.

Example 1

1. Preparation of Material A

Carbon fibers "Tenax" (registered trademark) STS40-24K (average fiber diameter: 7 μm, number of single fibers: 24000) manufactured by Toho Tenax Co., Ltd. and cut to a fiber length of 20 mm were used as carbon fibers, and a Nylon 6 resin A1030 manufactured by Unitika Ltd. was used as a resin, and a composite material of the carbon fibers and the Nylon 6 resin in which the carbon fibers were randomly oriented in two dimensions was prepared based on a method described in U.S. Pat. No. 8,946,342. The obtained composite material was heated at 2.0 MPa for 5 minutes in a press machine heated to 260° C. to obtain a flat plate-shaped material having an average thickness of 2.5 mm and 475 mm×350 mm.

As a result of analysis of the carbon fibers contained in the flat plate-shaped material, a volume fraction (Vf) of the carbon fibers was 35%, a fiber length of the carbon fibers was a constant length, and a weight average fiber length was 20 mm.

1.2 Preparation of Material B

Glass fibers EX2500 (average fiber diameter: 15 μm, fiber width: 9 mm) manufactured by Nippon Electric Glass Co., Ltd. was used as glass fibers, and a nylon 6 resin A1030 manufactured by Unitika Ltd. was used as a resin, and a composite material of the glass fibers and the nylon 6 resin in which the glass fibers were randomly oriented in two dimensions was prepared based on the method described in U.S. Pat. No. 8,946,342. The obtained composite material was heated at 2.0 MPa for 5 minutes in a press machine heated to 260° C. to obtain a flat plate-shaped material having an average thickness of 0.7 mm and 475 mm×350 mm. As a result of analysis of the glass fibers contained in the material, a volume fraction (Vf) of the glass fibers was 45%, a fiber length of the glass fibers was a constant length, and a weight average fiber length was 20 mm.

The linear expansion coefficient of the material B in an MD direction (machine direction) was $1.1 \times 10^{-5}$, and the linear expansion coefficient of the material B in a TD direction (transverse direction) was $1.8 \times 10^{-5}$. The coefficient of linear expansion Xb in Example 1 was set to $1.8 \times 10^{-5}$ because the TD direction was aligned with a direction that becomes a wave direction.

2. Preparation of Mold

Figure 11:
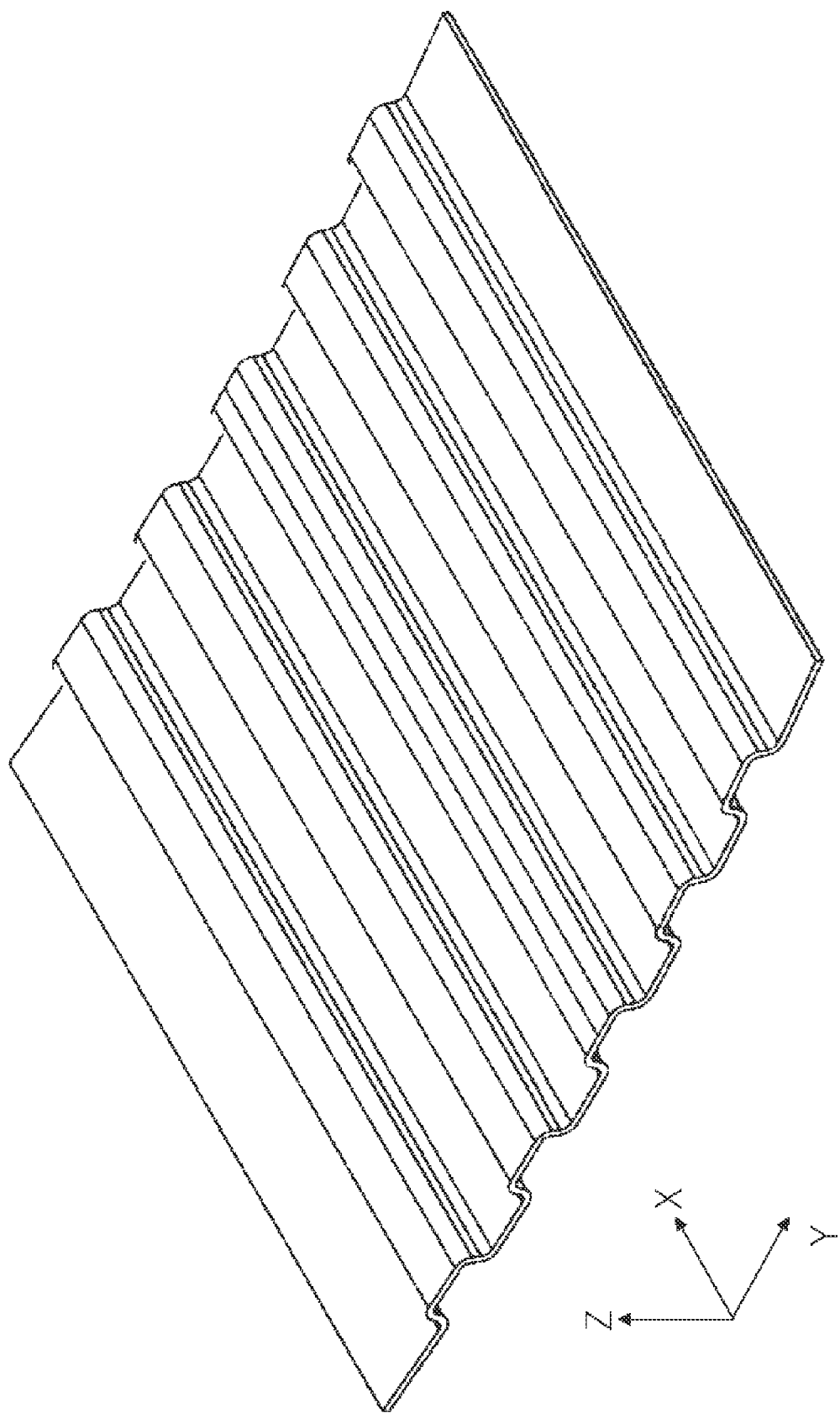
FIG. 11 is a schematic view showing an example of a molded body produced by the producing method of the present invention.

A mold for producing a molded body shown in FIG. 11 was prepared. A length of the molded body in the Y-axis direction was 40 cm, which was defined as Ly.

Here, the flatness Fc was set to 11 mm, the angle θ2 was set to 103° (the angles between S1 and S2 were all the same angle), the temperature to of the mold MA (upper mold) was set to 150° C., and the temperature tb of the mold MB (lower mold) was set to 150° C.

3. Cold-Pressing

The material A and the material B were dried in a hot air dryer at 120° C. for 4 hours, and then the material A and the material B were laminated in order, and the temperature was increased to 290° C. by an infrared heater.

Thereafter, the material B was placed so as to be brought into contact with the mold MB. At this time, a direction of 475 mm in the material (flat plate shape) of 475 mm×350 mm was set as the wave direction.

The upper mold was lowered, and the material A and the material B were pressed at the same time for 1 minute at a pressing pressure of 20 MPa (a time of 1 second from the start of pressing until reaching 20 MPa) to produce a cold-press molded body (400 mm×350 mm: wave direction (Y-axis direction in FIG. 11)×direction orthogonal to the wave direction (X-axis direction in FIG. 11)).

After one hour from the completion of the cold-pressing, the molded body had a wave shape shown in FIG. 11. In the molded body, the height h of the side wall was 12 mm, the length of the upper wall was 23 mm, and the length of the lower wall was 25 mm. Both the upper wall and the lower wall were connecting wall, and the molded body was observed so that the material B is on the lower side, and the length was measured by defining the upper wall and the lower wall.

The results are shown in Table 1. The flatness Fa of the molded body was as very high as 0.1 mm, and the warpage of the molded body was small. The state of warpage (the direction of warpage) was convex downward when the material B was left to stand still on a desk so as to be in contact with the desk. (For example, in FIG. 10, the warpage is depicted as being convex downward).

The longer the length of the molded body in the wave direction is, the more significant the problem of warpage is.

Example 2

An arrangement direction of a material of the material B was rotated by 90° with respect to Example 1, and lamination was performed with an MD direction as a wave direction. Therefore, a molded body was produced in the same manner as in Example 1 except that a linear expansion coefficient Xb in Example 2 was set to $1.1×10^{-5}$. The results are shown in Table 1.

Examples 3 to 5

A molded body 1b of the material B was 1.4 mm, 1.6 mm, or 2.0 min. The results are shown in Table 1. The state of warpage (the direction of warpage) was convex upward (not shown) when the material B was left to stand on a desk so as to be in contact with the desk.

Examples 6 to 8

Molded bodies were produced in the same manner as in Example 5 except that the flatness Fe of a mold cavity was set to 0 mm, the angle θ2 was set to 100°, and a temperature of the mold was set as shown in Tables 1 and 2. The results are shown in Tables 1 and 2.

In Examples 6 and 7, it was difficult to mass-produce the molded bodies while maintaining the temperature difference between the molds. 2 or 3 molded bodies could be produced, but further studies are necessary to produce 100 or more molded bodies.

Since the mold temperature of the mold in Example 8 was low, the molded body could not be shaped into a target shape slightly, and a part of the surface of the molded body was chipped. In addition, since the material is rapidly cooled, the transferability of the mold is deteriorated.

Example 9

Molded bodies were produced in the same manner as in Example 5 except that a shape of a mold cavity and a temperature of the mold were designed as shown in Table 2. The results are shown in Table 2.

Examples 10 and 11

Molded bodies were produced in the same manner as in Example 1 except that a volume fraction of fibers of glass fibers of the material B was changed as shown in Table 1. The results are shown in Table 2.

Comparative Example 1

A molded body was produced in the same manner as in Example 5 except that the angle θ2 of a mold cavity was set to 100° and a flatness was set to 0 (mm). The results are shown in Table 2.

Example 12

A molded body was produced in the same manner as in Example 1 except that a thickness of the material A was 3.6 mm and only the material A was used without using the material B, and a reference molded body P1 was prepared.

A molded body P2 was produced in the same manner as in Example 1 except that the thickness 1a of the material A was 2.6 mm and the thickness 1b of the material B was 1.0 mm.

The two molded bodies were subjected to a falling weight test. The test conditions were as follows: a weight mass was 16 kg, and heights were adjusted such that an impact of 135J, 145J, 155J, and 165J was applied respectively, and the following evaluation was performed. The results are shown in Table 3.

Perfect: No crack (crack in an in-plane direction) was observed on a surface opposite to a surface where a cone hit.

Excellent: Cracks of less than 10 mm (cracks in the in-plane direction) were generated on the surface opposite to the surface where the cone hit.

Good: Cracks of 10 mm or more (cracks in the in-plane direction) were generated on the surface opposite to the surface where the cone hit. Cracks (cracks in a plate thickness direction) were less than half the plate thickness.

Poor: Cracks of 10 mm or more (cracks in the in-plane direction) were generated on the surface opposite to the surface where the cone hit, and cracks (cracks in a plate thickness direction) were half or more the plate thickness.

TABLE 1

| | | Example 1 | Example 2 | Example 3 | Example 4 | Example 5 | Example 6 |
|---|---|---|---|---|---|---|---|
| Material | | | | | | | |
| Material layer A | | | | | | | |
| | Carbon fiber (VfA) | 35% | 35% | 35% | 35% | 35% | 35% |
| | Thermoplastic resin M1 | PA6 | PA6 | PA6 | PA6 | PA6 | PA6 |
| | Linear expansion coefficient in in-plane direction and wave direction Xa (/° C.) | $3.8 \times 10^{-6}$ | $3.8 \times 10^{-6}$ | $3.8 \times 10^{-6}$ | $3.8 \times 10^{-6}$ | $3.8 \times 10^{-6}$ | $3.8 \times 10^{-6}$ |
| | Thickness la (mm) | 2.5 | 2.5 | 2.5 | 2.5 | 2.5 | 2.5 |
| Material layer B | Glass fiber (VfB) | 45% | 45% | 45% | 45% | 45% | 45% |
| | Thermoplastic resin M2 | PA6 | PA6 | PA6 | PA6 | PA6 | PA6 |
| | Linear expansion coefficient in in-plane direction and wave direction Xb (/° C.) | $1.8 \times 10^{-5}$ | $1.1 \times 10^{-5}$ | $1.8 \times 10^{-5}$ | $1.8 \times 10^{-5}$ | $1.8 \times 10^{-5}$ | $1.8 \times 10^{-5}$ |
| | Thickness lb (mm) | 0.7 | 0.7 | 1.4 | 1.6 | 2.0 | 2.0 |
| Xa/Xb | | 0.21 | 0.35 | 0.21 | 0.21 | 0.21 | 0.21 |
| VfA/VfB | | 0.78 | 0.78 | 0.78 | 0.78 | 0.78 | 0.78 |
| Laminated structure | | A/B | A/B | A/B | A/B | A/B | A/B |
| Mold | | | | | | | |
| Mold cavity | | | | | | | |
| | Angle θ2 | 103 | 103 | 103 | 103 | 103 | 100 |
| | Flatness Fc (mm) | 11 | 11 | 11 | 11 | 11 | 0 |
| Upper mold temperature ta | | 150 | 150 | 150 | 150 | 150 | 150 |
| Lower mold temperature tb | | 150 | 150 | 150 | 150 | 150 | 125 |
| Mold temperature difference \|ta − tb\| | | | | | | | |
| Molded body | | | | | | | |
| | Angle θ1 | 100 | 100.5 | 95 | 92 | 90 | 95 |
| | θ2 − θ1 | 3 | 2.5 | 8 | 11 | 13 | 5 |
| | Flatness Fa (mm) | 0.1 | 0.15 | 4 | 12 | 8 | 8 |
| | Warpage shape | Convex downward | Convex downward | Convex upward | Convex upward | Convex upward | Convex downward |
| | Standing plane height h (mm) | 12 | 12 | 12 | 12 | 12 | 12 |
| Evaluation of molded body and compression-molding | | | | | | | |
| | (θ2 − θ1) ÷ (Xa/Xb) | 14.21 | 7.24 | 37.89 | 52.11 | 61.58 | 23.68 |
| | Fa/h | 0.01 | 0.01 | 0.33 | 1.00 | 0.67 | 0.67 |
| | Fc/h | 0.92 | 0.92 | 0.92 | 0.92 | 0.92 | 0.00 |
| | (Fc/h) ÷ (Xa/Xb) | 4.34 | 2.65 | 4.34 | 4.34 | 4.34 | 0.00 |
| | \|ta − tb\| ÷ (Xa/Xb) | 0.0 | 0.0 | 0.0 | 0.0 | 0.0 | 118.4 |
| | la/lb | 3.6 | 3.6 | 1.8 | 1.6 | 1.3 | 1.3 |
| | lb/la | 0.3 | 0.3 | 0.6 | 0.6 | 0.8 | 0.8 |
| | (Fc − Fa)/h ÷ (Xa/Xb) | 4.3 | 2.6 | 2.8 | −0.4 | 1.2 | −3.2 |

TABLE 2

| | | Example 7 | Example 8 | Example 9 | Example 10 | Example 11 | Comparative Example 1 |
|---|---|---|---|---|---|---|---|
| Material | | | | | | | |
| Material layer A | | | | | | | |
| | Carbon fiber (VfA) | 35% | 35% | 35% | 35% | 35% | 35% |
| | Thermoplastic resin M1 | PA6 | PA6 | PA6 | PA6 | PA6 | PA6 |
| | Linear expansion coefficient in in-plane direction and wave direction Xa (/° C.) | $3.8 \times 10^{-6}$ | $3.8 \times 10^{-6}$ | $3.8 \times 10^{-6}$ | $3.8 \times 10^{-6}$ | $3.8 \times 10^{-6}$ | $3.8 \times 10^{-6}$ |
| | Thickness la (mm) | 2.5 | 2.5 | 2.5 | 2.5 | 2.5 | 2.5 |
| Material layer B | Glass fiber (VfB) | 45% | 45% | 45% | 40% | 50% | 45% |
| | Thermoplastic resin M2 | PA6 | PA6 | PA6 | PA6 | PA6 | PA6 |
| | Linear expansion coefficient in in-plane direction and wave direction Xb (/° C.) | $1.8 \times 10^{-5}$ | $1.8 \times 10^{-5}$ | $1.8 \times 10^{-5}$ | $2.0 \times 10^{-5}$ | $1.6 \times 10^{-5}$ | $1.8 \times 10^{-5}$ |
| | Thickness lb (mm) | 2.0 | 2.0 | 2.0 | 0.7 | 0.7 | 2.0 |

TABLE 2-continued

|  | Example 7 | Example 8 | Example 9 | Example 10 | Example 11 | Comparative Example 1 |
|---|---|---|---|---|---|---|
| Xa/Xb | 0.21 | 0.21 | 0.21 | 0.19 | 0.24 | 0.21 |
| VfA/VfB | 0.78 | 0.78 | 0.78 | 0.88 | 0.70 | 0.78 |
| Laminated structure | A/B | A/B | A/B | A/B | A/B | A/B |
| Mold |  |  |  |  |  |  |
| Mold cavity |  |  |  |  |  |  |
| Angle θ2 | 100 | 100 | 101 | 103 | 103 | 100 |
| Flatness Fc (mm) | 0 | 0 | 9 | 11 | 11 | 0 |
| Upper mold temperature ta | 150 | 100 | 150 | 150 | 150 | 150 |
| Lower mold temperature tb | 100 | 100 | 100 | 150 | 150 | 150 |
| Mold temperature difference |ta − tb| |  |  |  |  |  |  |
| Molded body |  |  |  |  |  |  |
| Angle θ1 | 100 | 100 | 100 | 99.5 | 100.2 | 90 |
| θ2 − θ1 | 0 | 0 | 1 | 3.5 | 2.8 | 10 |
| Flatness Fa (mm) | 0.1 | 0.2 | 0 | 0.05 | 0.12 | 17 |
| Warpage shape | Convex downward | Convex downward | Convex downward | Convex downward | Convex downward | Convex downward |
| Standing plane height h (mm) | 12 | 12 | 12 | 12 | 12 | 12 |
| Evaluation of molded body and compression-molding |  |  |  |  |  |  |
| (θ2 − θ1) ÷ (Xa/Xb) | 0.00 | 0.00 | 4.74 | 18.42 | 11.79 | 47.37 |
| Fa/h | 0.01 | 0.02 | 0.00 | 0.00 | 0.01 | 1.42 |
| Fc/h | 0.00 | 0.00 | 0.75 | 0.92 | 0.92 | 0.00 |
| (Fc/h) ÷ (Xa/Xb) | 0.00 | 0.00 | 3.55 | 4.82 | 3.86 | 0.00 |
| |ta − tb| ÷ (Xa/Xb) | 236.8 | 0.0 | 236.8 | 0.0 | 0.0 | 0.0 |
| la/lb | 1.3 | 1.3 | 1.3 | 3.6 | 3.6 | 1.3 |
| lb/la | 0.8 | 0.8 | 0.8 | 0.3 | 0.3 | 0.8 |
| (Fc − Fa)/h ÷ (Xa/Xb) | 0.0 | −0.1 | 3.6 | 4.8 | 3.8 | −6.7 |

TABLE 3

|  | Energy [J] | Evaluation |
|---|---|---|
| Reference molded body P1 | 135 | Excellent |
|  | 145 | Good |
|  | 155 | Good |
|  | 165 | Poor |
| Molded body P1 | 135 | Perfect |
|  | 145 | Excellent |
|  | 155 | Excellent |
|  | 165 | Good |

Comparative Example 2

A molded body was produced in the same manner as in Example 1 except that a sheet molding compound (SMC) was used as the material B. The results are shown in Table 4.

The SMC was used, in which glass fibers were contained in a matrix of a vinyl ester resin (thermosetting resin).

Comparative Example 3

A molded body was produced in the same manner as in Example 1 except that iron was used as the material B. The results are shown in Table 4.

TABLE 4

|  |  | Comparative Example 2 | Comparative Example 3 |
|---|---|---|---|
| Material |  |  |  |
| Material layer A |  |  |  |
|  | Carbon fiber (VfA) | 35% | 35% |
|  | Thermoplastic resin M1 | PA6 | PA6 |
|  | Linear expansion coefficient in in-plane direction and wave direction Xa (/° C.) | $3.8 \times 10^{-6}$ | $3.8 \times 10^{-6}$ |
|  | Thickness la (mm) | 2.5 | 2.5 |
| Material layer B | Glass fiber (VfB) | 40% | — |
|  | Matrix | Vinyl ester resin | iron |
|  | Linear expansion coefficient in in-plane direction and wave direction Xb (/° C.) | $1.8 \times 10^{-5}$ | $1.0 \times 10^{-5}$ |
|  | Thickness lb (mm) | 2.75 | 0.5 |

TABLE 4-continued

|  | Comparative Example 2 | Comparative Example 3 |
|---|---|---|
| Xa/Xb | 0.21 | 0.38 |
| VfA/VfB | 0.88 | — |
| Laminated structure | A/B | A/B |
| Mold | | |
| Mold cavity | | |
| Angle θ2 | 103 | 103 |
| Flatness Fc (mm) | 11 | 11 |
| Upper mold temperature ta | 150 | 150 |
| Lower mold temperature tb | 150 | 150 |
| Mold temperature difference |ta − tb| | 0 | 0 |
| Molded body | | |
| Angle θ1 | 100 | 102 |
| θ2 − θ1 | 3 | 1 |
| Flatness Fa (mm) | 0.1 | 0.15 |
| Warpage shape | Convex downward | Convex downward |
| Standing plane height h (mm) | 12 | 12 |
| Evaluation of molded body and compression-molding | | |
| (θ2 − θ1) ÷ (Xa/Xb) | 14.21 | 2.63 |
| Fa/h | 0.01 | 0.01 |
| Fc/h | 0.92 | 0.92 |
| (Fc/h) ÷ (Xa/Xb) | 4.34 | 2.41 |
| |ta − tb| ÷ (Xa/Xb) | 0.0 | 0.0 |
| la/lb | 0.9 | 5.0 |
| lb/la | 1.1 | 0.2 |
| (Fc − Fa)/h ÷ (Xa/Xb) | 4.3 | 2.4 |

The molded bodies of Comparative Examples 2 and 3 had small warpage. It was noted that, in Comparative Example 3, problems such as peeling of the material layer A from iron and cracking of iron occurred after molding.

INDUSTRIAL APPLICABILITY

The molded body of the present invention and the molded body obtained by molding the molded body are used in various constituent members, for example, structural members of automobiles, various electric products, frames and housings of machines, and all other parts where impact absorbing is desired. Particularly preferably, the molded body can be used as an automobile part.

Although the present invention has been described in detail and with reference to particular embodiments, it will be apparent to those skilled in the art that various changes and modifications can be made without departing from the spirit and scope of the invention.

The present application is based on Japanese Patent Application (Japanese Patent Application No. 2020-184217) filed on Nov. 4, 2020, and contents thereof are incorporated herein by reference.

REFERENCE SIGNS LIST

A: Material A
B: Material B
101, 401: Side wall
102: Connecting wall
402: Connecting wall of upper wall (material B is disposed on lower side and observed)
403: Connecting wall of lower wall (material B is disposed on lower side and observed)
X: X-axis direction
Y: Y-axis direction
Z: Z-axis direction
θ1: Angle between side wall and connecting wall
θ2: Angle between mold surface S1 for forming connecting wall and mold surface S2 for forming side wall in mold MB
θ3: Angle between side wall and connecting wall in a state in which angle θ1 is stress-deformed and molded bodies are joined
MA: Mold to be in contact with material A
MB: Mold to be in contact with material B
701: Rib
801: Force for stress-deformation
802: Other component for joining
901: Two parallel ideal straight lines
902: Lower wall of connecting wall
903: Bottom surface of lower wall
Ly: Length in wave direction (40 cm)
h: Height of side wall
Lyc: Length in wave direction (40 cm)
1201: Mold surface for forming lower wall
1202: Two parallel ideal straight lines
T1, T2: Molded body

The invention claimed is:

1. A method for producing a molded body, comprising:
bringing a material A into contact with a mold MA and bringing a material B into contact with a mold MB respectively; and
compression-molding the material A and the material B using the mold MA and the mold MB which are a pair of male and female molds, wherein
the material A contains a carbon fiber and a thermoplastic resin M1, the material B contains a glass fiber and a thermoplastic resin M2, the molded body includes a pair of side walls and a connecting wall that is connected to the side walls, cross section of the molded body has a wave shape, and a relationship between a flatness Fa of the molded body and a height h of the side wall satisfies 0≤Fa/h<1.3, wherein an angle θ1 between the side wall and the connecting wall on a side where the material B is present in a surface layer satisfies 90°≤θ1<160°, and the mold MB has a mold surface S1 for forming the connecting wall and a mold surface S2 for forming the side wall, and an angle θ2 between S1 and S2 satisfies θ1<θ2.

2. The method for producing a molded body according to claim 1, wherein the cross section of the molded body has a plurality of wave shapes, and a length in a wave direction is 1 m or more.

3. The method for producing a molded body according to claim 1, wherein

Xa, Xb, θ1, and θ2 satisfy the following formulae (1) and (2), where Xa is a linear expansion coefficient of the material A, and Xb is a linear expansion coefficient of the material B, $$0.01 \leq Xa/Xb < 1 \quad \text{Formula (1)}$$

$$0 \leq (\theta 2 - \theta 1) \div (Xa/Xb) < 1.0 \times 10^3 \quad \text{Formula (2)}$$

wherein the linear expansion coefficient Xa of the material A is a linear expansion coefficient of the material in a direction that becomes a wave direction when the molded body is formed, and the linear expansion coefficient Xb of the material B is a linear expansion coefficient of the material in the direction that becomes the wave direction when the molded body is formed.

4. The method for producing a molded body according to claim 1, wherein a flatness Fc of a mold cavity used for compression-molding satisfies Fa≤Fc.

5. The method for producing a molded body according to claim 4, wherein the following formulae (1) and (3) are satisfied, where Xa is a linear expansion coefficient of the material A, and Xb is a linear expansion coefficient of the material B, $$0.01 \leq Xa/Xb < 1 \quad \text{Formula (1)}$$

$$0 \leq (Fc - Fa)/h \div (Xa/Xb) < 1.0 \times 10^3 \quad \text{Formula (3)}$$

wherein the linear expansion coefficient Xa of the material A is a linear expansion coefficient of the material in a direction that becomes the wave direction when the molded body is formed, and the linear expansion coefficient Xb of the material B is a linear expansion coefficient of the material in the direction that becomes the wave direction when the molded body is formed.

6. The method for producing a molded body according to claim 1, wherein the following formulae (1) and (4) are satisfied, where Xa is a linear expansion coefficient of the material A, and Xb is a linear expansion coefficient of the material B, $$0.01 \leq Xa/Xb < 1 \quad \text{Formula (1)}$$

$$0 < |ta - tb| \div (Xa/Xb) < 5000 \quad \text{Formula (4)}$$

Xa: linear expansion coefficient of material A
Xb: linear expansion coefficient of material B
ta: temperature of mold MA
tb: temperature of mold MB wherein the linear expansion coefficient Xa of the material A is a linear expansion coefficient of the material in a direction that becomes the wave direction when the molded body is formed, and the linear expansion coefficient Xb of the material B is a linear expansion coefficient of the material in the direction that becomes the wave direction when the molded body is formed.

7. The method for producing a molded body according to claim 1, wherein the mold MA is an upper mold, and the mold MB is a lower mold.

8. The method for producing a molded body according to claim 1, wherein the molded body is an impact resistant absorber, and the material A is on a side to which an impact is applied.

9. The method for producing a molded body according to claim 1, wherein the molded body further comprises a rib between the connecting wall and the side wall.

10. The method for producing a molded body according to claim 1, wherein the molded body further comprises a material C between the material A and the material B, wherein a relationship among the linear expansion coefficient Xa of the material A, the linear expansion coefficient Xb of the material B, and a linear expansion coefficient Xc of the material C satisfies Xa<Xc<Xb, wherein the linear expansion coefficient Xa of the material A is a linear expansion coefficient of the material in a direction that becomes the wave direction when the molded body is formed, the linear expansion coefficient Xb of the material B is a linear expansion coefficient of the material in the direction that becomes the wave direction when the molded body is formed, and the linear expansion coefficient Xc of the material C is a linear expansion coefficient of the material in a direction that becomes the wave direction when the molded body is formed.

11. The method for producing a molded body according to claim 1, wherein a linear expansion relaxation agent is mixed such that 0.8≤Xa/Xb≤1 is satisfied, where Xa is the linear expansion coefficient of the material A, and Xb is the linear expansion coefficient of the material B, wherein the linear expansion coefficient Xa of the material A is a linear expansion coefficient of the material in a direction that becomes the wave direction when the molded body is formed, and the linear expansion coefficient Xb of the material B is a linear expansion coefficient of the material in the direction that becomes the wave direction when the molded body is formed.

12. The method for producing a molded body according to claim 1, wherein the thermoplastic resin M2 having a smaller linear expansion coefficient than that of the thermoplastic resin M1 is used to adjust to 0.8≤Xa/Xb≤1, where Xa is the linear expansion coefficient of the material A, and Xb is the linear expansion coefficient of the material B, wherein the linear expansion coefficient Xa of the material A is a linear expansion coefficient of the material in a direction that becomes the wave direction when the molded body is formed, and the linear expansion coefficient Xb of the material B is a linear expansion coefficient of the material in the direction that becomes the wave direction when the molded body is formed.

13. The method for producing a molded body according to claim 1, wherein a temperature ta of the mold MA and a temperature tb of the mold MB are equal to or lower than room temperature +10° C.

14. The method for producing a molded body according to claim 1, wherein the material A and the material B are laminated and then subjected to compression-molding.

15. The method for producing a molded body according to claim 14, wherein the material A and the material B have a flat plate shape before compression-molding.

16. The method for producing a molded body according to claim 14, wherein when the material A and the material B are formed into the molded body, the material A forms a material layer A and the material B forms a material layer B.

17. A method for producing a molded body, comprising:
bringing a material A into contact with a mold MA and bringing a material B into contact with a mold MB respectively; and
compression-molding the material A and the material B using the mold MA and the mold MB which are a pair of male and female molds, wherein
the material A contains a carbon fiber and a thermoplastic resin M1,
the material B contains a glass fiber and a thermoplastic resin M2,
the molded body includes a pair of side walls and a connecting wall that is connected to the side walls,
cross section of the molded body has a wave shape, and
a relationship between a flatness Fa of the molded body and a height h of the side wall satisfies 0≤Fa/h<1.3, wherein
a thickness 1a of the material A is 0.5 mm or more and less than 5.0 mm, and
a thickness 1b of the material B is 0.5 mm or more and 3.0 mm or less, and 1<1a/1b<0.6 or 0.1<1b/1a<0.6 is satisfied.

18. A method for producing a molded body, comprising:
bringing a material A into contact with a mold MA and bringing a material B into contact with a mold MB respectively; and
compression-molding the material A and the material B using the mold MA and the mold MB which are a pair of male and female molds, wherein
the material A contains a carbon fiber and a thermoplastic resin M1,
the material B contains a glass fiber and a thermoplastic resin M2,
the molded body includes a pair of side walls and a connecting wall that is connected to the side walls,
cross section of the molded body has a wave shape, and
a relationship between a flatness Fa of the molded body and a height h of the side wall satisfies 0≤Fa/h<1.3, wherein
a relationship between a volume fraction of fibers VfA of the material A and a volume fraction of fibers VfB of the material B satisfies the following formulae (1) and (5), where Xa is the linear expansion coefficient of the material A, and Xb is the linear expansion coefficient of the material B, $$0.01 \leq Xa/Xb < 1 \quad \text{Formula (1)}$$

$$0.3 \leq VfA/VfB \leq 3.0 \quad \text{Formula (5)}$$

wherein
the linear expansion coefficient Xa of the material A is a linear expansion coefficient of the material in a direction that becomes the wave direction when the molded body is formed, and
the linear expansion coefficient Xb of the material B is a linear expansion coefficient of the material in the direction that becomes the wave direction when the molded body is formed.

19. A method for producing a joined body, the method comprising:
joining a molded body produced by the producing method according to claim 1, wherein the molded body includes a pair of side walls and a connecting wall that is connected to the side walls, an angle θ1 between the side wall and the connecting wall on a side where the material B is present in a surface layer satisfies 90°≤θ1<160°, by:
reducing the angle θ1 of the molded body by stress deformation to satisfy a relationship 0≤Fa'/h<0.1 between a flatness Fa' of the molded body after the stress deformation and a height h of the side wall.

* * * * *